US009070248B2

(12) United States Patent
Brooks et al.

(10) Patent No.: US 9,070,248 B2
(45) Date of Patent: Jun. 30, 2015

(54) MECHANICAL WHEELS FOR GAME MACHINES

(71) Applicant: IGT, Las Vegas, NV (US)

(72) Inventors: Jack Henry Brooks, Reno, NV (US); Kehl T. LeSourd, Reno, NV (US); Anish Cherian Mathew, Reno, NV (US); Megan E. Oehlert, Reno, NV (US); Mindy V. Eustaquio, Reno, NV (US); Jean Pierre Legras, Carson City, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 14/027,087

(22) Filed: Sep. 13, 2013

(65) Prior Publication Data

US 2015/0050982 A1 Feb. 19, 2015

Related U.S. Application Data

(63) Continuation of application No. 13/969,290, filed on Aug. 16, 2013, now Pat. No. 8,979,636.

(51) Int. Cl.
*A63F 13/00* (2014.01)
*G07F 17/32* (2006.01)

(52) U.S. Cl.
CPC .................................. *G07F 17/3213* (2013.01)

(58) Field of Classification Search
None
See application file for complete search history.

(56) References Cited

U.S. PATENT DOCUMENTS

| | | | | |
|---|---|---|---|---|
| 6,224,483 | B1 | 5/2001 | Mayeroff | |
| 6,398,220 | B1 * | 6/2002 | Inoue | 273/142 R |
| 6,988,731 | B2 | 1/2006 | Inoue | |
| 7,226,358 | B2 | 6/2007 | Miller et al. | |
| 7,461,842 | B2 | 12/2008 | Wu | |
| 7,862,422 | B2 * | 1/2011 | Garamendi et al. | 463/20 |
| 8,360,878 | B2 * | 1/2013 | Petri | 463/30 |
| 8,517,382 | B1 | 8/2013 | Pagliuca | |
| 8,523,684 | B2 | 9/2013 | Lutnick et al. | |
| 2004/0000754 | A1 * | 1/2004 | Inoue | 273/143 R |
| 2004/0018866 | A1 | 1/2004 | Inoue | |
| 2004/0214630 | A1 | 10/2004 | Mayeroff | |
| 2006/0025195 | A1 | 2/2006 | Pennington et al. | |
| 2006/0025200 | A1 | 2/2006 | Van Asdale | |
| 2007/0054727 | A1 * | 3/2007 | Garamendi et al. | 463/16 |
| 2007/0149281 | A1 * | 6/2007 | Gadda et al. | 463/34 |
| 2008/0146331 | A1 * | 6/2008 | Nordman et al. | 463/31 |
| 2009/0117977 | A1 * | 5/2009 | Gelber et al. | 463/20 |
| 2010/0105474 | A1 * | 4/2010 | Shimizu | 463/32 |
| 2010/0184510 | A1 * | 7/2010 | Nittou | 463/30 |
| 2011/0227281 | A1 * | 9/2011 | Vancura | 273/142 B |

* cited by examiner

*Primary Examiner* — Sunit Pandya
(74) *Attorney, Agent, or Firm* — Neal, Gerber & Eisenberg LLP

(57) ABSTRACT

Electronic gaming machines having mechanical or electromechanical wheel devices are described herein. The gaming machines include a cabinet, a display coupled to the cabinet, and a wheel coupled to the cabinet. The wheel includes a plurality of wheel segments positioned axially about a center point of the wheel. The plurality of wheel segments may be configured to rotate about the center point and to transform an appearance of the wheel. The wheel further includes an indicator configured to indicate an indicated wheel segment. The indicator may be configured to rotate about the center point.

29 Claims, 30 Drawing Sheets

MECHANICAL WHEELS FOR GAME MACHINES

CROSS-REFERENCE TO RELATED APPLICATIONS

This application is a continuation of U.S. patent application Ser. No. 13/969,290, entitled "IMPROVED MECHANICAL WHEELS FOR GAME MACHINES," filed on Aug. 16, 2013, which is hereby incorporated by reference in its entirety and for all purposes.

FIELD OF THE INVENTION

This application relates to gaming devices, and more particularly to improved mechanical wheel devices for use on wagering game machines that enhance the player experience without creating excessive amounts of electromagnetic emissions.

BACKGROUND

Electronic Gaming Machines ("EGMs"), otherwise known as slot machines, constitute the most profitable form of gambling in casinos today. EGMs are a combination of specialized hardware and software which present a wagering game of chance to a player. Typical EGM hardware includes a bill acceptor for receiving money, a button panel for receiving player input, a display device for presenting the game, a credit meter for displaying to the player an amount of money or credits available for wagering, a ticket printer for dispensing money vouchers, and a master game controller for interacting with the other hardware components and executing EGM software. Typical EGM software includes system firmware, an operating system and game software for controlling the outcome and presentation of the game to the player.

The early EGM's were all physical reel slot machines. When the player activated the game, the EGM software randomly picked a particular game outcome out of several thousand possibilities. The software then instructed the game controller to activate stepper motors connected to each reel, in a coordinated manner, to cause the reels to spin and then stop one at a time (simulating the much older mechanical slot machines) so that symbols on the reels lined up, or were intentionally misaligned, on one or more paylines, in accordance with the selected game outcome. The credit meter was then credited by an amount corresponding to the game outcome minus the amount wagered. Later EGM's utilized a video display to display the game and related information to the player. These so called video EGM's gave EGM manufacturers more freedom to create new and enticing types of wager games.

One of the hallmarks of good wagering game design is the creation of suspense and anticipation for a big win to keep the player interested in continued play of the game. A common technique for accomplishing the creation of such suspense and anticipation is through the use of a bonus game. The non-bonus aspect of the game is referred to as the base game to differentiate it from the bonus game. Typically, the EGM is programmed such that there is a small random chance that the bonus game will be entered into upon each play of the base game. To create an optimal amount of anticipation for the bonus game, the bonus game should: occur infrequently enough to make its occurrence a special occasion; occur frequently enough to encourage the player to continue playing the base game in anticipation of the playing the bonus game; and provide the player the perception that a big win is possible every time the EGM enters into the bonus game.

A variety of different types of bonus games have been implemented on EGMs with varying degrees of commercial success. One of the more popular types of EGM bonus games has historically been wheel-based bonus games. A wheel-based bonus game is typically configured as a top box containing a mechanical wheel that is mounted on top of a physical or virtual reel EGM. Such wheels are typically divided into multiple equally-sized varicolored segments each having printed numbers thereon indicating a base number of credits to be won if the segment is indicated as the winning segment. Forward facing posts are positioned on lines that separate the segments at the periphery of the wheel. A spring loaded indicator is mounted on the top box slightly in the path of rotation of the posts such that the indicator temporarily pivots then releases as each post passes by the indicator. When the wheel stops spinning, the winning segment is the segment whose posts are aligned on either side of the indicator.

The wheel-based bonus game is typically commenced upon a special symbol or symbol combination appearing in the base reel game. Upon commencement, the EGM processor sends information to a wheel controller indicating which segment corresponds to a determined bonus game outcome. In response, the wheel controller sends signals to a stepper motor connected to the wheel to cause the wheel to spin and then stop such that the winning segment is aligned with the indicator. The award amounts printed on each segment are staggered somewhat between high and low value to prolong as long as possible the player's optimism that the winning segment will be a high valued segment. Additionally, the pivoting indicator makes a hypnotic ratcheting sound as each post passes the indicator, thus adding to the sense of suspense when the wheel is spun.

In an effort to build upon the success of standard wheel-based bonus games, several variations of the standard bonus wheel have been implemented or proposed. Many of these variations involve some combination of a display device and a mechanical reel. Incorporating a display device onto a spinning mechanical reel typically requires that power and data communications be routed to the display device through one or more slip rings. One of the drawbacks to using slip rings to conduct data communications or power is that such rings produce undesirable amounts of electromagnetic ("EM") emissions. Generally, the more power lines or data communication lines that a slip ring or multiple slip rings conduct, the more EM emissions such ring or rings produce. EGM manufacturers are required by the FCC to keep the EM emissions from each EGM within certain tolerances to reduce the effects of electromagnetic interference (EMI) on other electronic devices. Designing combination display and mechanical wheel bonus games that do not exceed the mandated EM limits has proven challenging for EGM manufacturers. New and exciting wheel-based games are needed that do not increase the overall EM emissions from the EGM.

These and other considerations have led to the evolution of the present invention.

SUMMARY

The present invention in the disclosed embodiments provides for new and exciting wheel-based bonus games having a minimal amount of EM radiation. The wheels of the various embodiments create anticipation and excitement and ways not done before with previous wheel-based game variations.

An exemplary embodiment relates to an electronic gaming machine The electronic gaming machine includes a cabinet, a display coupled to the cabinet, and a wheel coupled to the cabinet. The wheel includes a hub centered on a central axis and a plurality of wheel segments positioned axially about the hub. Each wheel segment includes an inner end connected to the hub such that an outer end of each wheel segment can be raised and lowered in a direction that is generally parallel to the central axis. The wheel further includes an indicator configured to rotate about the central axis and configured to indicate an indicated wheel segment, wherein the indicated wheel segment is one of the plurality of wheel segments, wherein the indicated wheel segment changes as the indicator rotates about the central axis. The wheel includes a wheel controller configured to control the rotation of the indicator. The electronic gaming machine further includes a processor communicatively coupled to the display and the wheel controller, wherein the processor is configured to provide game play of a wager-based game to a player, display gaming information to the player through the display, detect a trigger event during game play of the wager-based game, and instruct the wheel controller cause rotation of the indicator around the wheel. The indicated wheel segment is moved into a raised position with respect to the other wheel segments of the plurality of wheel segments. The changing of the indicated wheel segment as the indicator rotates around the hub provides a visual wave effect to the player during the presentation of the bonus game.

Another exemplary embodiment relates to a wheel assembly for a gaming machine. The wheel assembly includes a hub centered on a central axis. The wheel assembly further includes a plurality of wheel segments positioned axially about the hub, each wheel segment having an inner end hingeably connected to the hub such that an outer end of each wheel segment can be raised and lowered in a direction that is generally parallel to the central axis. The wheel assembly includes an indicator configured to rotate about the central axis and configured to indicate an indicated wheel segment, wherein the indicated wheel segment is one of the plurality of wheel segments, wherein the indicated wheel segment changes as the indicator rotates about the central axis. When the indicated wheel segment is pivoted about the inner end of the indicated wheel segment such that the outer end of the indicated wheel segment is raised with respect to the outer ends of the other wheel segments of the plurality of wheel segments. The changing of the indicated wheel segment as the indicator rotates around the hub provides a visual wave effect to a viewer of the wheel assembly.

Yet another exemplary embodiment relates to a wheel segment configured to be placed in a wheel assembly of a gaming machine. The wheel segment includes an inner end configured to be hingeably received at a wheel hub. The wheel segment further includes an outer end spaced apart by a distance from the inner end. The wheel segment includes a top surface positioned between the inner end and the outer end, wherein the top surface is generally triangular shaped. The wheel segment further includes a bottom surface positioned between the inner end and the outer end, wherein the bottom surface is generally triangular shaped. The wheel segment includes a follower extending from the bottom surface, wherein the follower is configured to slide along a cam track.

An exemplary embodiment relates to an electronic gaming machine. The gaming machine includes a cabinet, a display coupled to the cabinet, and a wheel assembly coupled to the cabinet. The wheel assembly includes a hub having a central axis, a containment chassis surrounding a circumference of the hub, a plurality of wheel segments positioned axially between the hub and the containment chassis, and an indicator for indicating a wheel segment of the plurality of wheel segments. Each of the plurality of wheel segments are rotatably mounted between the hub and the containment chassis such that the plurality of wheel segments can be rotated about a plurality of wheel segment axes, wherein each of the plurality of wheel segment axes intersects the central axis. The hub, the containment chassis, and the plurality of wheel segments are configured to rotate about the central axis. The wheel assembly further includes a controller configured to control the rotation of the hub, the containment chassis, and the plurality of wheel segments about the central axis, the controller is further configured to control the rotation of the plurality of wheel segments about the plurality of wheel segment axes. The gaming machine further includes a processor communicatively coupled to the display and the controller, wherein the processor is configured to provide game play of a wager-based game to a player, display gaming information to the player through the display, detect a trigger event during game play of the wager-based game, and instruct the controller to cause rotation of the hub, the containment chassis, and the plurality of wheel segments about the central axis and/or rotates the plurality of wheel segments about the plurality of wheel segment axes to indicate an outcome via the indicator in response to the detected trigger event.

Another exemplary embodiment relates to a wheel assembly for a gaming machine. The wheel assembly includes a hub having a central axis. The wheel assembly further includes a containment chassis surrounding a circumference of the hub. The wheel assembly includes a plurality of wheel segments positioned axially between the hub and the containment chassis, each of the plurality of wheel segments rotatably mounted between the hub and the containment chassis such that the plurality of wheel segments can be rotated about a plurality of wheel segment axes, wherein each of the plurality of wheel segment axes intersects the central axis. The wheel assembly further includes a stationary outer frame surrounding a circumference of the containment chassis. The wheel assembly includes an indicator coupled to the stationary outer frame, the indicator configured to indicate a wheel segment of the plurality of wheel segments. The hub, the containment chassis, and the plurality of wheel segments are configured to rotate with respect to the stationary outer frame about the central axis. The hub, the containment chassis, and the plurality of wheel segments are configured to rotate about the central axis independent of rotation of the plurality of wheel segments about the plurality of wheel segment axes.

Yet another exemplary embodiment relates to a wheel segment configured to be placed in a wheel assembly of a gaming machine. The wheel segment includes an inner end having a first shaft configured to be received in a central hub of the wheel assembly. The wheel segment further includes an outer end having a second shaft configured to be received in a containment chassis of the wheel assembly. The wheel segment includes a first face extending between the inner end and the outer end, wherein the first face includes a first value indicia. The wheel segment further includes a second face extending between the inner end and the outer end, wherein the second face includes a second value indicia. The first shaft and the second shaft define an axis of rotation and the wheel segment is configured to rotate around the axis of rotation.

An exemplary embodiment relates to an electronic gaming machine. The gaming machine includes a cabinet, a display coupled to the cabinet, and a wheel assembly coupled to the cabinet. The wheel assembly includes a hub having a central axis. The wheel assembly further includes a first set of foldable wheel segments extending axially from the hub, the first set of foldable wheel segments foldable between an open display state and a closed folded state. The wheel assembly includes a first activation unit including a first set of activation arms, wherein the first activation unit is linearly positionable along the central axis between a first raised position and a first lowered position, wherein the first set of foldable wheel segments is in the open display state when the first activation unit is in the first raised position, wherein the first set of foldable wheel segments is in the closed folded state when the first activation unit is in the first lowered position, wherein each of the first set of activation arms is connected to a foldable wheel segment of the first set of foldable wheel segments. The wheel assembly further includes a second set of foldable wheel segments extending axially from the hub, the second set of foldable wheel segments foldable between the open display state and the closed folded state. The wheel assembly includes a second activation unit including a second set of activation arms, wherein the second activation unit is linearly positionable along the central axis between a second raised position and a second lowered position, wherein the second set of foldable wheel segments is in the open display state when the second activation unit is in the second raised position, wherein the second set of foldable wheel segments is in the closed folded state when the second activation unit is in the second lowered position, wherein each of the second set of activation arms is connected to a foldable wheel segment of the second set of foldable wheel segments. The hub, the first set of foldable wheel segments, the first activation unit, the second set of foldable wheel segments, and the second activation unit are configured to rotate about the central axis. The wheel assembly includes a controller configured to control the rotation of the hub, the first set of foldable wheel segments, the first activation unit, the second set of foldable wheel segments, and the second activation unit about the central axis, the controller is further configured to move each of the first activation unit and the second activation unit along the central axis. The gaming machine further includes a processor communicatively coupled to the display and the controller, wherein the processor is configured to provide game play of a wager-based game to a player, display gaming information to the player through the display, detect a trigger event during game play of the wager-based game, and instruct the controller to present a game element to the player through the wheel assembly. The controller rotates the hub, the first set of foldable wheel segments, the first activation unit, the second set of foldable wheel segments, and the second activation unit and slides the first and second activation units along the central axis. The first and second activation units move in opposing directions along the central axis such that when the first activation unit is in the first raised position, the second activation unit is in the second lowered position, and when the first activation unit is in the first lowered position, the second activation unit is in the second raised position.

Another exemplary embodiment relates to a wheel assembly for a gaming machine. The wheel assembly includes a hub having a central axis. The wheel assembly further includes a stationary outer chassis surrounding a circumference of the hub. The wheel assembly includes a first set of foldable wheel segments extending between the hub and the stationary outer chassis, the first set of foldable wheel segments foldable between an open display state and a closed folded state. The wheel assembly further includes a first activation unit coupled to the first set of foldable wheel segments, wherein the first activation unit is linearly positionable along the central axis between a first raised position and a first lowered position, wherein the first set of foldable wheel segments is in the open display state when the first activation unit is in the first raised position, wherein the first set of foldable wheel segments is in the closed folded state when the first activation unit is in the first lowered position. The wheel assembly includes a second set of foldable wheel segments extending axially between the hub and the stationary outer chassis, the second set of foldable wheel segments foldable between the open display state and the closed folded state. The wheel assembly further includes a second activation unit coupled to the second set of foldable wheel segments, wherein the second activation unit is linearly positionable along the central axis between a second raised position and a second lowered position, wherein the second set of foldable wheel segments is in the open display state when the second activation unit is in the second raised position, wherein the second set of foldable wheel segments is in the closed folded state when the second activation unit is in the second lowered position. The hub, the first set of foldable wheel segments, the first activation unit, the second set of foldable wheel segments, and the second activation unit are configured to rotate about the central axis. The controller rotates the hub, the first set of foldable wheel segments, the first activation unit, the second set of foldable wheel segments, and the second activation unit and slides the first and second activation units along the central axis. The first and second activation units only move in opposite directions along the central axis such that when the first activation unit is in the first raised position, the second activation unit is in the second lowered position, and when the first activation unit is in the first lowered position, the second activation unit is in the second raised position.

Yet another exemplary embodiment relates to a foldable wheel segment configured to be placed in a wheel assembly of a gaming machine. The foldable wheel segment includes a first foldable half segment having a first portion of an indicia thereon. The foldable wheel segment further includes a second foldable half segment having a second portion of an indicia thereon. The foldable wheel segment includes a hinge coupled between the first foldable half segment and the second foldable half segment, wherein the hinge is configured to bias the first foldable half segment and the second foldable half segment into a partially open state, wherein the hinge is configured to be coupled to an arm of an activation unit. The first foldable half segment and the second foldable half segment are symmetrical. The first foldable half segment and the second foldable half segment are foldable between an open display state and a closed display state. When the first foldable half segment and the second foldable half segment are in the open display state, the first portion of the indicia and the second portion of the indicia for substantially continuous view of the indicia.

An exemplary embodiment relates to an electronic gaming machine. The gaming machine includes a cabinet, a first display coupled to the cabinet, and a wheel assembly coupled to the cabinet. The wheel assembly includes a plurality of wheel segments, a second display positioned behind the plurality of wheel segments from a perspective of a player of the electronic gaming machine, and an activation mechanism. The gaming machine further includes a processor communicatively coupled to the first display, the second display, and the activation mechanism, wherein the processor is configured to provide game play of a wager-based game to a player, display gaming information to the player through the first display, detect a trigger event during game play of the wager-based game, and instruct the activation mechanism to move the plurality of wheel segments. The activation mechanism is configured to move the plurality of wheel segments relative to each other between a closed orientation, in which the plurality of wheel segments prevent the player from viewing the second display, and an open orientation, in which the plurality of wheel segments form an opening that allows the player to view the second display. The activation mechanism is configured to rotate the plurality of wheel segments about a central axis.

Another exemplary embodiment relates to a wheel assembly for a gaming machine. The wheel assembly includes a plurality of wheel segments, a display positioned behind the plurality of wheel segments from a perspective of a viewer of the wheel assembly, and an activation mechanism. The activation mechanism is configured to move the plurality of wheel segments relative to each other between a closed orientation, in which the plurality of wheel segments prevent the viewer from viewing the second display, and an open orientation, in which the plurality of wheel segments form an opening that allows the viewer to view the display. The activation mechanism is configured to rotate the plurality of wheel segments about a central axis.

Yet another exemplary embodiment relates to a wheel segment configured to be placed in a wheel assembly of a gaming machine. The wheel segment includes an outer edge and an inner tip. The wheel segment further includes a face defined between the outer edge and the inner tip, wherein the face is generally wedge shaped. The wheel segment includes a first control tab coupled to the outer edge, wherein the first control tab includes a first opening. The wheel segment further includes a second control tab coupled to the outer edge, wherein the second control tab includes a second opening. The first control tab and the second control tab are coplanar with the face.

An exemplary embodiment relates to an electronic gaming machine. The gaming machine includes a cabinet, a display coupled to the cabinet, and a wheel assembly coupled to the cabinet. The wheel assembly includes a plurality of wheel segments configured to rotate about a central axis. The wheel assembly further includes a plurality of gap segments to rotate about a central axis. The wheel assembly includes a star piece configured to rotate about the central axis. The wheel assembly further includes an indictor configured to indicate a specific wheel segment of the plurality of wheel segments or a specific gap segment of the plurality of gap segments. The wheel assembly includes an activation mechanism configured to position the plurality of wheel segments and the plurality of gap segments are between a contracted state, in which the plurality of wheel segments are positioned adjacent to each other and at least substantially cover the plurality of gap segments from the perspective of a player of the gaming machine, and an expanded state, in which the plurality of wheel segments are displaced away from the central axis and adjacent wheel segments are separated by a gap segment of the plurality of gap segments such that the plurality of gap segments are visible from the perspective of the player, wherein the star piece is visible to the player during the expanded state and is not visible to the player in the contracted state. The gaming machine further includes a controller configured to provide game play of a wager-based game to a player, including displaying gaming information to the player through the display, detecting a trigger event during game play of the wager-based game, and controlling the wheel mechanism in response to the trigger event including controlling the rotation of the plurality of wheel segments, the plurality of gap segments, and the star piece about the central axis, and instructing the activation mechanism to move the plurality of wheel segments and the plurality of gap segments between the contracted state and the expanded state.

Another exemplary embodiment relates to a wheel assembly for a gaming machine. The wheel assembly includes a plurality of wheel segments configured to rotate about a central axis. The wheel assembly further includes a plurality of gap segments to rotate about a central axis. The wheel assembly includes a star piece configured to rotate about the central axis. The wheel assembly further includes an indictor configured to indicate a specific wheel segment of the plurality of wheel segments or a specific gap segment of the plurality of gap segments. The wheel assembly includes an activation mechanism configured to position the plurality of wheel segments and the plurality of gap segments are between a contracted state, in which the plurality of wheel segments are positioned adjacent to each other and at least substantially cover the plurality of gap segments from the perspective of a player of the gaming machine, and an expanded state, in which the plurality of wheel segments are displaced away from the central axis and adjacent wheel segments are separated by a gap segment of the plurality of gap segments such that the plurality of gap segments are visible from the perspective of the player, wherein the star piece is visible to the player during the expanded state and is not visible to the player in the contracted state.

Yet another exemplary embodiment relates to an electronic gaming machine. The gaming machine includes a cabinet, a display coupled to the cabinet, and a wheel assembly coupled to the cabinet. The wheel assembly includes a track structure configured to rotate about a central axis. The wheel assembly further includes a link activation structure configured to rotate about a central axis, wherein the link activation structure is further configured to rotate with respect to the track structure. The wheel assembly includes a plurality of wheel segments configured to rotate about a central axis and a plurality of gap segments to rotate about a central axis. The wheel assembly further includes an indictor configured to indicate a specific wheel segment of the plurality of wheel segments or a specific gap segment of the plurality of gap segments. The relative rotation of the link activation structure with respect to the track structure causes movement of the plurality of wheel segments and the plurality of gap segments are between a contracted state, in which the plurality of wheel segments are positioned adjacent to each other and at least substantially cover the plurality of gap segments from the perspective of a player of the gaming machine, and an expanded state, in which the plurality of wheel segments are displaced away from the central axis and adjacent wheel segments are separated by a gap segment of the plurality of gap segments such that the plurality of gap segments are visible from the perspective of the player. The gaming machine further includes a controller configured to provide game play of a wager-based game to a player, including displaying gaming information to the player through the display, detecting a trigger event during game play of the wager-based game, and controlling the wheel mechanism in response to the trigger event including controlling the rotation of the plurality of wheel segments, the plurality of gap segments, and the star piece about the central axis, and instructing the activation mechanism to move the plurality of wheel segments and the plurality of gap segments between the contracted state and the expanded state.

A more complete appreciation of the invention and its scope, and the manner in which it achieves the above and other improvements, can be obtained by reference to the following detailed description of presently preferred embodiments taken in conjunction with the accompanying drawings, which are briefly summarized below, and the appended claims.

BRIEF DESCRIPTION OF THE FIGURES

The details of one or more implementations are set forth in the accompanying drawings and the description below. Other features, aspects, and advantages of the disclosure will become apparent from the descriptions, the drawings, and the claims, in which:

DETAILED DESCRIPTION

Figure 1:
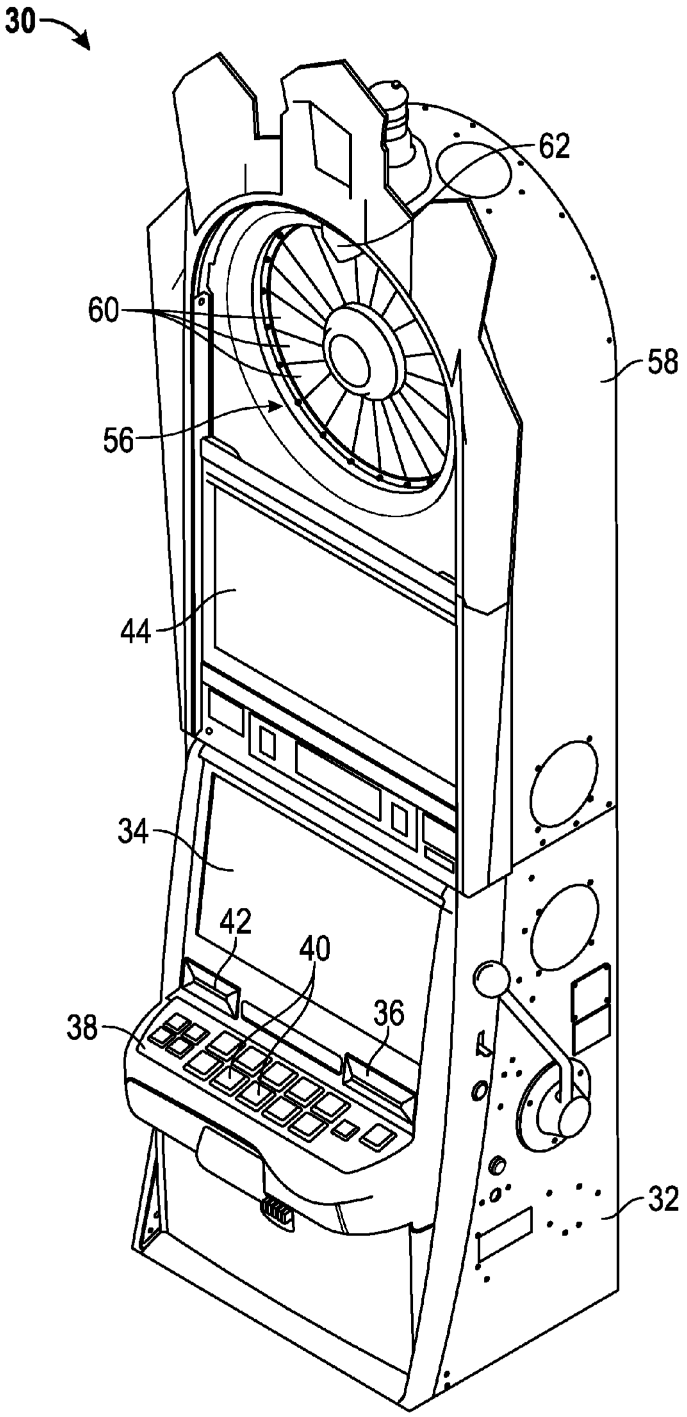
FIG. 1 is a perspective view of an EGM and topper combination in which various embodiments of the invention may be implemented.
Figure 2:
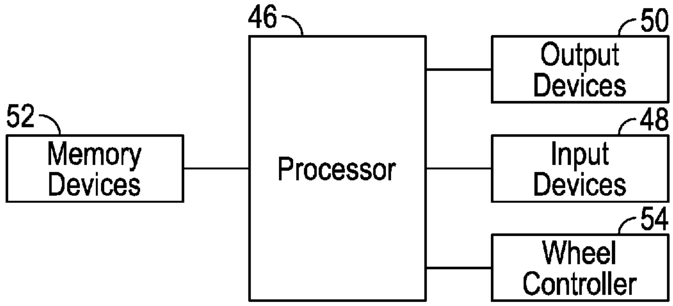
FIG. 2 is a block diagram of the EGM of FIG. 1 according to an exemplary embodiment.
Figure 3:
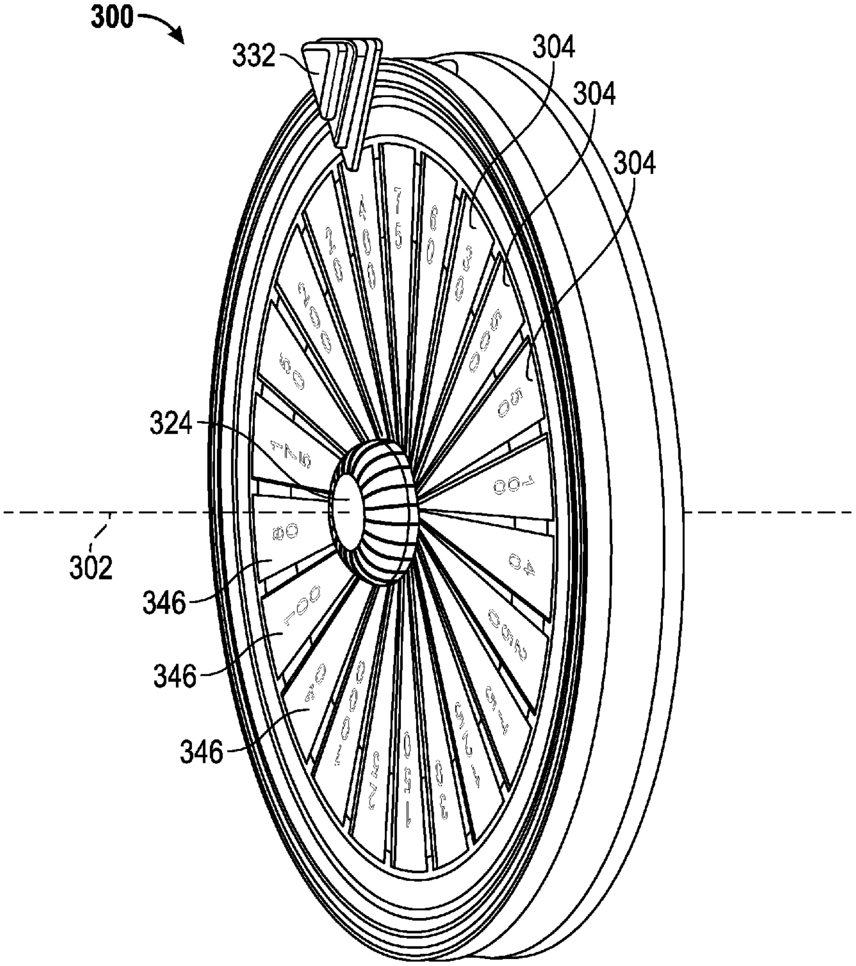
FIGS. 3-6 relate to a wave wheel apparatus for an EGM according to an exemplary embodiment.
Figure 4:
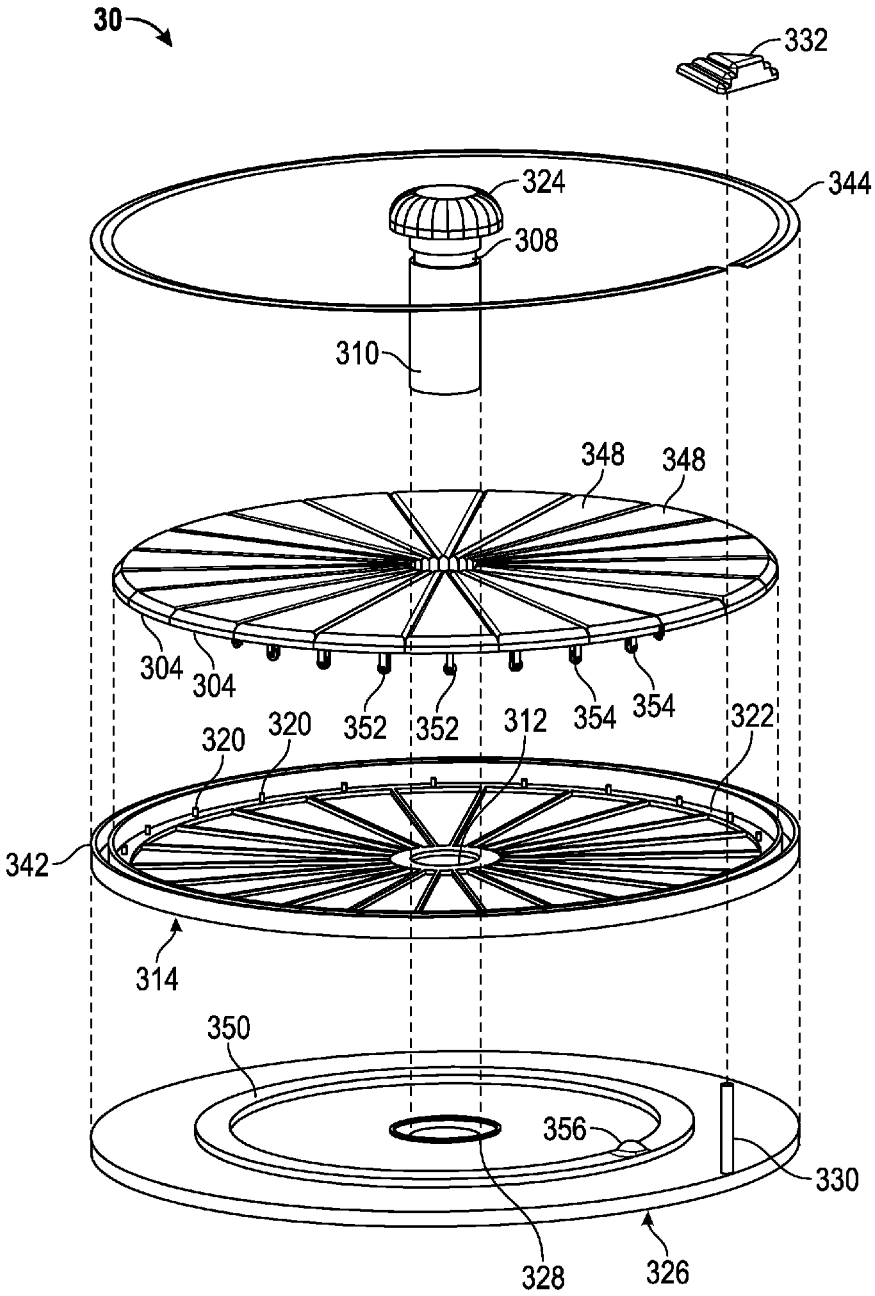
Figure 5:
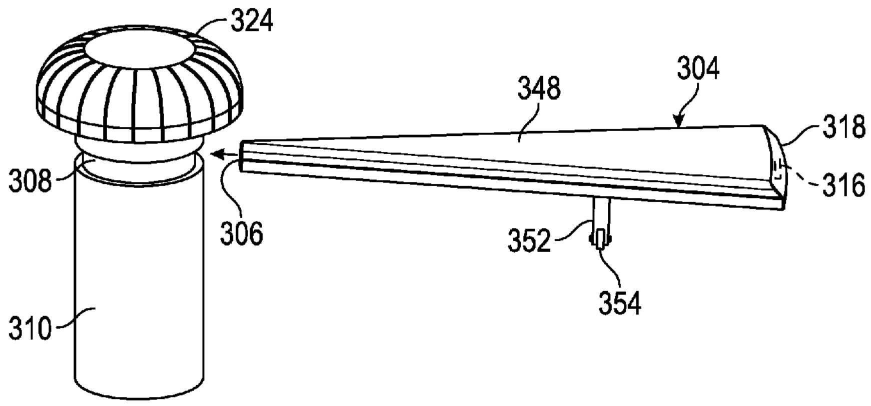
Figure 6:
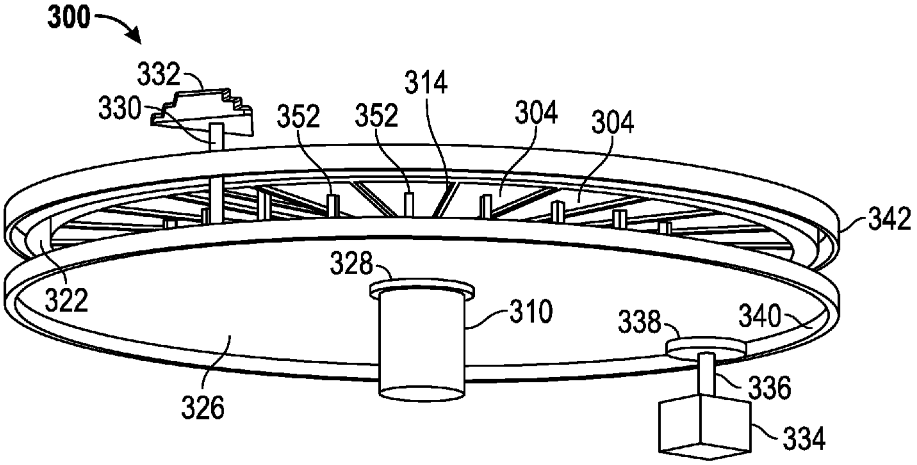
Figure 7:
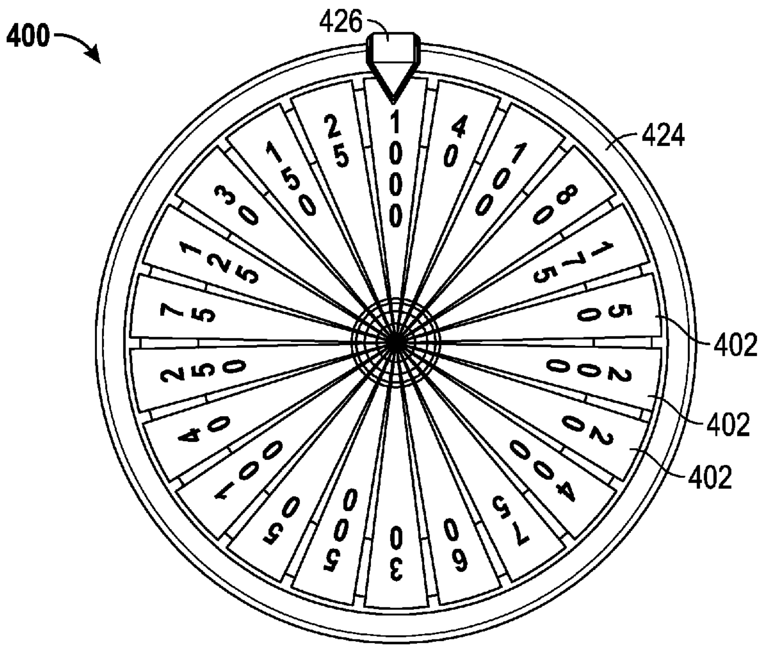
FIGS. 7-11 relate to a rotor wheel apparatus for an EGM according to an exemplary embodiment.
Figure 8:
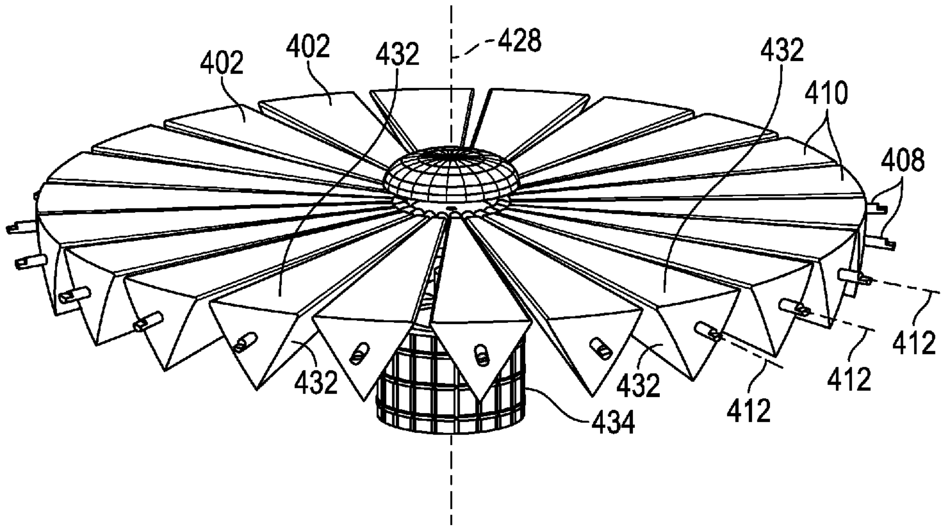
Figure 9:
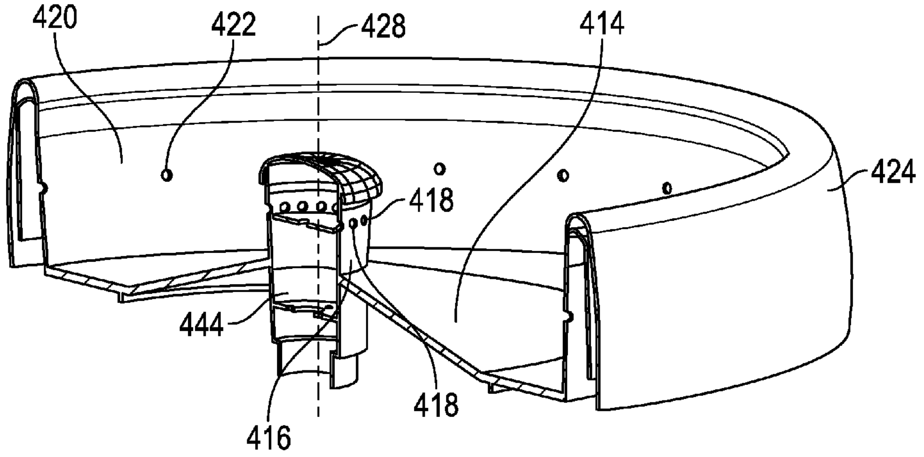
Figure 10:
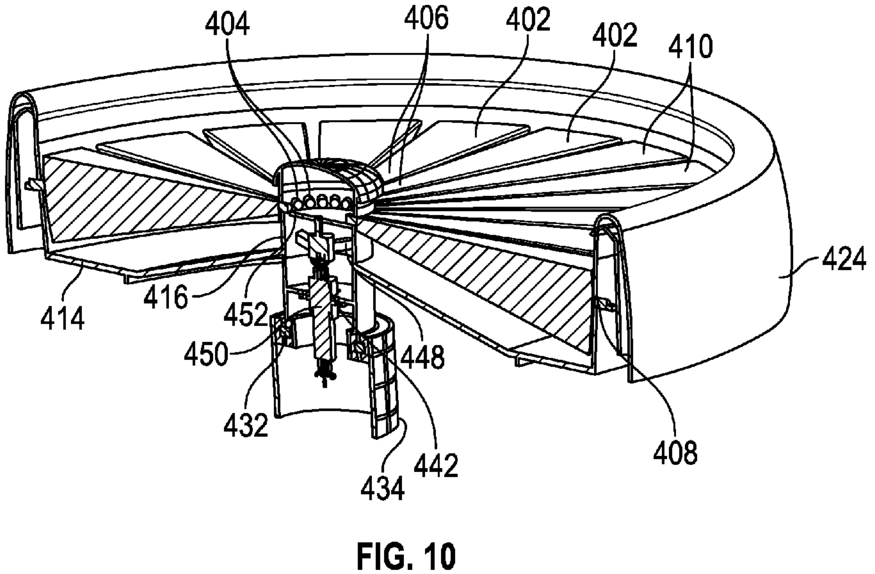
Figure 11:
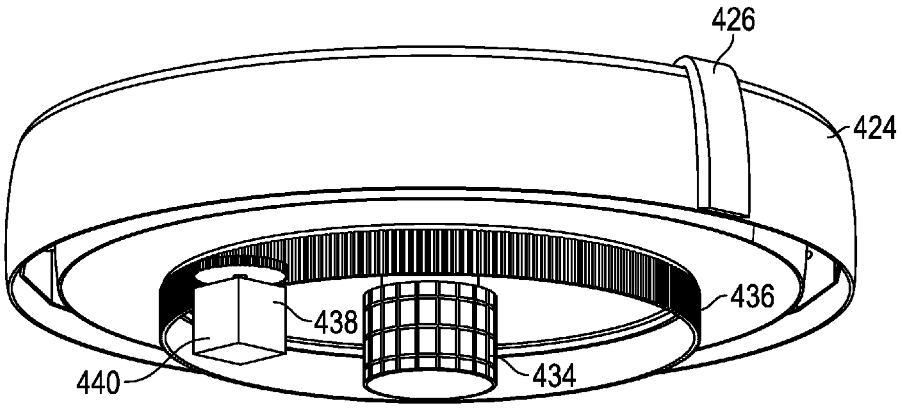

The improved wheel devices of the present invention may be incorporated into a wide variety of wagering game machines. For example, any of the wheel devices may be incorporated into a game machine in which a spin of the wheel is the primary game offered by the game machine. Any of the wheel devices may be incorporated into a single game machine as a secondary or bonus game. Any of the wheel devices may be commonly connected to a plurality of game machines which each has a primary game and use the commonly connected wheel device as a secondary or bonus game. Any of the wheel devices may reveal game outcomes determined by a locally attached game machine or by a server. A preferred electronic game machine ("EGM") 30 for incorporating the wheel devices described herein is shown in conjunction with FIGS. 1 and 2 and described below.

EGM 30 includes an enclosed cabinet 32 in which is mounted a main display 34 for displaying the play and outcome of a main game. A combined bill and ticket acceptor 36 receives either cash or ticket vouchers from a player which the EGM 30 converts to credits usable for play of the game. A button panel 38 contains a plurality of push buttons 40 for communicating player choices to the EGM 30. The push buttons 40 each have specific functions which may include: selecting one of a preselected number of credits to bet per payline; selecting one of a preselected number of paylines to play per game; selecting to play the maximum number of credits; initiating play of a wheel game; or cashing out. A ticket printer 42 prints a ticket voucher having a cash value corresponding to the number of credits attributed to the player when the cash out button is pressed. A secondary display 44 may be utilized in a variety of different ways, including displaying a paytable for the game offered by the EGM 30 or displaying the play and outcome of a bonus game.

An EGM processor 46 within the cabinet 32 is communicatively coupled to the main display 34, the bill and ticket acceptor 36, the push buttons 40, the ticket printer 42 and the secondary display 44 (collectively, input devices 48 and output devices 50). The EGM processor 46 is also connected to various data storage devices within the cabinet 32 such as computer memory and a disk drive (collectively, memory devices 52) which stores an operating system and software for one or more games that the EGM 30 may offer for play. The EGM processor 46 is also communicatively coupled with a wheel controller 54 which controls the operations of a wheel device 56. The wheel device 56 is typically spun through the use of one or more stepper motors connected to the wheel device 56 and under the control of the wheel controller 54. The wheel device 56 is utilized to convey the result of a wheel game of the EGM 30. The wheel controller 54 is often housed along with the wheel device 56 inside of a top portion of the EGM 30 referred to as a topper 58.

The wheel device 56 includes a plurality of segments 60 corresponding to different award amounts or outcomes. When the wheel game involving the wheel device 56 is invoked, the EGM 30 instructs the wheel controller 54 to spin the wheel device 56 and to stop the wheel device 56 such that a preselected outcome is shown to the player. The outcome is communicated to the player by the segment 60 corresponding to the preselected outcome being in alignment with an indicator 62 when the wheel device 56 stops spinning. The player is then awarded the number of credits corresponding to the award amount for the segment 60 in alignment with the indicator 62. Typically, the base game that is displayed on the main display 34 includes certain outcomes which trigger the play of a bonus game involving the wheel device 56. Such outcomes may be displayed to the player in various ways, such as one or more special symbols appearing on a payline which indicate that a play of the bonus game has been awarded.

Various different embodiments of the improved wheel devices are described below. The phrase 'wheel game' is used below to generically refer to a game that utilizes one of the improved wheel devices. The wheel game is typically commenced by rotating the wheel device relative to an indicator. The wheel may be rotated with respect to the EGM, the indicator may be rotated around the wheel, or some combination of both may be implemented. The wheel game typically ends when a predetermined 'winning' segment is in alignment with the indicator after the relative movement between the wheel device and the indicator comes to a halt. Various embodiments of the wheel devices disclosed herein may present or indicate an award in different ways.

The terms proximal and distal as used herein are relative to a player viewing the wheel device from the front. Proximal is in a direction towards the player and distal is in a direction away from the player. The term central axis refers to the axis about which each of the wheel devices rotates. The term X-axis is used to generally refer to a direction parallel to the central axis. The term center rotation refers to rotation of the wheel device about the central axis. The term inward is used to refer to a radial direction towards the central axis and the term outward is used to refer to a radial direction away from the central axis.

Wave Wheel

A first embodiment of the improved wheel device is described below as wave wheel 300 with reference to FIGS. 3-6. Wave wheel 300 includes a plurality of segments 304 positioned around a central axis 302 of the wave wheel 300. An inner end 306 of each segment 304 is hingeably positioned within an annular recess 308 of a center hub 310. The positioning of the inner ends 306 of the segments 304 within the annular recess 308 prevents movement of the inner end 306 of the segments 304 along the X-axis. The center hub 310 is press fit within a circular opening 312 formed in a segment support structure 314. The segment support structure 314 confines the movement of the segments 304 both distally and radially. A guide hole 316 formed towards an outer end 318 of each of the segments 304 fits over separate ones of guide posts 320 which extend proximally from a flat ring portion 322 of the segment support structure 314. The outer ends 318 of the segments 304 are biased in the distal direction to rest against the flat ring portion 322 of the segment support structure 314. This bias may be accomplished by the fit between the inner ends 306 of the segments 304 and the annular recess 308 of the center hub 310, or may be accomplished through the use of springs or other known techniques and devices. A small amount of force applied to the outer end 318 of any of the segments 304 in the proximal direction causes the outer end 318 to displace from the flat ring portion 322 by a small amount. A decorative hub cover 324 is attached to the proximal side of the center hub 310. A distal portion of the center hub 310 is further rigidly connected to a structural support (not shown) within a housing, or top box (FIG. 1) in which the wave wheel 300 is mounted. The center hub 310 bears the weight of the wave wheel 300.

A circular base plate 326 is rotatably connected to the center hub 310 by a bearing 328 which allows the circular base plate 326 to rotate about the stationary center hub 310. An extended support post 330 is rigidly connected to the circular base plate 326 at an axial position slightly beyond the perimeter of the segment support structure 314. The extended support post 330 extends proximally past the proximal position of the segment support structure 314. A drive motor 334 is mounted to the same structure (such as the top box) as the center hub 310 and is maintained stationary with respect to the center hub 310. The drive motor 334 is operable to cause the rotation of a drive shaft 336 and connected drive gear 338. A plurality of outward facing teeth (not shown) on the drive gear 338 mesh with corresponding inward facing teeth (not shown) on an inner gear lip 340 of the circular base plate 326. Operation of the drive motor 334 causes the drive shaft 336 and drive gear 338 to rotate, which in turn causes the rotation of the circular base plate 326, extended support post 330 and award indicator 332. Viewed from the player's perspective, the operation of the drive motor 334 causes the award indicator 332 to rotate around the periphery of the wave wheel 300 while the segments 304 remain in the same axial position. An outer ring 342 and gap cover 344 are rotatably connected to the segment support structure 314 and rigidly connected to the extended support post 330. The outer ring 342 and gap cover 344 rotate around the segment support structure 314 in a manner similar to a bearing, without relative movement occurring between the segment support structure 314 and the outer ring 342 or gap cover 344 in the X-axis.

An award indicator 332 is rigidly connected to a proximal end of the extended support post 330. Indicia 346 printed or otherwise formed on a forward facing face 348 of each segment 304 indicates an amount of credits to be won during play of the wheel game if the award indicator 332 indicates that segment 304 to be the winning segment. The award indicator 332 indicates that a particular segment 304 is the winning segment by remaining adjacent and closest to that segment 304 when the award indicator 332 comes to a halt following the rotation of the award indicator 332 around the segments 304 during play of the wheel game.

A characteristic feature of the wave wheel 300 is the coordinated movement of the segments 304 in the X-axis as the award indicator 332 rotates around the segments 304. A lift track 350 formed on the circular base plate 326 defines a contour that affects the X-axis position of the segment segments 304 as the circular base plate 326 rotates. A support leg 352 is attached to and extends distally from each segment 304. The support leg 352 is terminated by a wheel 354 which contacts and rides along the lift track 350 as the circular base plate 326 rotates. The bias of the segments 304 in the distal direction due to the fit of the inner ends 306 of the segment segments 304 within the annular recess 308 of the center hub 310 maintains contact between the wheels 354 and the lift track 350. A bump 356 formed on the lift track 350 is an example of a type of contour that the lift track 350 may have. The rotation of the circular base plate 326 causes the lift track 350 to rotate behind the wheels 354 of the segments 304. As the bump 356 rotates behind each segment 304, the wheel 354 of each segment rides over the bump 356 causing a resultant proximal movement of the segment 304. The lift track 350 thus acts a cam mechanism with respect to the wheels 354 which act as followers. In the shown embodiment of the wave wheel 300, the bump 356 is radially aligned with the award indicator 332 resulting in each segment 304 'popping' or temporarily lifting towards the player as the award indicator 332 passes each segment 304.

Since the center hub 310 and segments 304 remain in the same axial orientation, various types of lighting techniques may be combined with the wave wheel 300 without the need for EM producing slip rings. For example, wires can be easily routed through the center hub 310 and connected to individual LEDs or other light devices incorporated into either the decorative hub cover 324 or even into the segments 304. Such light devices might be programmed to highlight individual segments 304 in coordinate manner, such as in conjunction with the lifting of each segment 304 by the bump 356.

Alternate embodiments of the wave wheel 300 may involve the circular base plate 326 and rigidly connected parts remaining stationary while the center hub 310 and segments 304 rotate about the central axis 302 during play of the wheel game. Alternatively, the circular base plate 326 may rotate relative to the central hub 310 and segments 304 while both component collections are rotating about the central axis 302.

Variations in the manner in which the segments 304 move in the X-axis are also contemplated. Instead of the segments 304 pivoting in the proximal direction about the hinged connection to the center hub 310, the segments 304 may alternately be configured to move in the X-axis while remaining perpendicular to the X-axis. To accomplish such movement the segments 304 could be connected to the center hub 310 in such a way as to allow the inner end 306 of each segment 304 to move in the X-axis, through the use of posts on the center hub 310 for each segment 304 similar to the guide posts 320.

Variations in the popping, or coordinated movement of the segments 304 as the award indicator 332 rotates around the segments 304 is also contemplated. The contour of the lift track 350 may be formed such that several segments 304 pop in the proximal direction in a coordinated sequence as the award indicator 332 rotates around the segments 304. Of course, the wave wheel 300 could incorporate more than one award indicator 332 with each award indicator 332 having an associated bump 356, or other predetermined special contour associated with each of the award indicators 332. The contour of the lift track 350 could also utilize a depression instead of a bump to orient the segments 304 in a normal lifted position and then move each segment 304 distally as the award indicator 332 passes by the segment 304. Additionally, the wheels 354 may be substituted for a reduced friction termination cap which glides along the lift track 350.

In order for the wheels 354 to be in continuous contact with the lift track 350, the segment support structure 314 should be placed close enough to the circular base plate 326 so that the outer ends 318 of the segments 304 are displaced slightly proximally from the segment support structure 314. Alternatively, the segment support structure 314 may be slightly more displaced from the circular base plate 326 such that the outer ends 318 of the segments 304 are normally in contact with the flat ring portion 322 of the segment support structure 314. In this orientation, the wheels are contemplated to be slightly spaced apart from the lift track 350 except for when the bump 356 contacts and lifts the wheel 354 as the bump 356 rotates by. This configuration may have the advantage of being less noisy than having the wheels 354 make continuous contact with the lift track 350.

The popping of the segments 304 as the award indicator 332 revolves around the segment segments 304 creates an exciting new visual effect to captivate the attention of the player and spectators during play of the wheel game. The wave wheel 300 provides for this new and captivating visual effect without introducing the negative effects of additional EM radiation.

Rotor Wheel

A second embodiment of the improved wheel device is described below as rotor wheel 400 with reference to FIGS. 7-11. Rotor wheel 400 includes a plurality of three-sided rotor segments 402, each having a threaded shaft 404 protruding from inner ends 406 of the rotor segments 402 and a cylindrical pin 408 protruding from outer ends 410 of the rotor segments 402. Each rotor segment 402 has a rotor segment axis 412 about which the threaded shaft 404 and cylindrical pin 408 are centered. The rotor segments 402 are mounted within a containment chassis 414. A cylindrical inner hub 416 of the containment chassis 414 has hub openings 418 formed thereon in which the threaded shafts 404 are positioned. An outer rim 420 of the containment chassis 414 has rim openings 422 formed thereon in which the cylindrical pins 408 are positioned. The hub openings 418 and the rim openings 422 are positioned to maintain the rotor segments 402 in a fixed axial relationship. The hub openings 418 and the rim openings 422 are sized slightly larger than the shafts 404 and cylindrical pins 408, respectively, so as not to inhibit the rotation of the rotor segments 402 about their respective rotor segment axes 412.

The containment chassis 414 and rotor segments 402 are rotationally mounted within, and rotate with respect to an outer frame 424. Rigidly attached to the outer frame 424 is an award indicator 426. During play of the wheel game, the rotor segments 402 and containment chassis 414 may rotate about a central axis 428 ("center rotation") with respect to the outer frame 424 and award indicator 426, which remains stationary. Additionally, each of the rotor segments 402 may rotate about its own rotor segment axis 412 ("rotor rotation") to selectively display to the player one of the three rotor faces 432 of the rotor segments 402 during play of the wheel game. The three different rotor faces 432 of the rotor segments 402 effectively increase the number of possible winning outcomes by a factor of three compared to a conventional wheel game with single-faced segment segments. The rotor rotation of the rotor segments 402 may occur while the rotor segments 402 are rotating about the central axis 428. The rotor rotation creates additional visual appeal while also creating new opportunities for variations on the typical wheel game.

A distal end of the inner hub 416 is connected to a bearing 432 which allows for rotational movement of the inner hub 416 about the central axis 428 with respect to a stationary support structure 434. The support structure 434 is for rigidly mounting the rotor wheel 400 to a top box or other portion of a game machine. A chassis gear 436 attached to a distal side of the containment chassis 414 meshes with a drive gear 438 that is driven by a wheel drive motor 440. The wheel drive motor 440 is also rigidly mounted to the top box or other portion of the game machine. Operation of the wheel drive motor 440 causes the entire containment chassis 414 and rotor segments 402 to rotate about the central axis 428. The outer frame 424 and award indicator 426 are also rigidly mounted to the top box or other portion of the game machine. In some embodiments the outer frame 424 extends around the distal portion of the containment chassis 414 and is rigidly integrated with the wheel drive motor 440 and the support structure 434.

A rotor rotation mechanism 442 is positioned within an open interior 444 defined by the inner hub 416 and is responsible for the rotation of the rotor segments 402 about the rotor segment axes 412. The rotor rotation mechanism 442 includes a rotor drive motor 446 that is rigidly connected to an inner surface of the inner hub 416 by support arms 448. A slip ring 450 is also mounted to the inner surface of the inner hub 416 and transfers power to the rotor drive motor 446 from stationary power cables positioned within an interior of the support structure 434. A pinion gear 452 is connected to the rotor drive motor 446 and rotates about the central axis 428 and with respect to the inner hub 416 when the rotor drive motor 446 is activated. The pinion gear 452 meshes with the threaded shafts 404 of the rotor segments 402. Rotation of the pinion gear 452 with respect to the inner hub 416 causes all of the rotor segments 402 to rotate about their respective rotor segment axes 412.

The wheel drive motor 440 and rotor drive motor 446 may be operated by a controller mounted within the top box. The controller may be preprogrammed to cause the rotation of the containment chassis 414 in a predetermined manner and to stop the rotation such that a predetermined rotor segment 402 is in alignment with the award indicator 426. The controller may also be programmed to cause the rotation of the rotor segments 402 one hundred and twenty degrees in either direction about the rotor segment axis, so that a different one of the rotor faces 430 is selectively displayed. In embodiments in which a controller operates the motors 440 and 446, the controller is programmed to perform predetermined actions in response to receiving predetermined instructions from the EGM processor that are sent in response to game play events.

A wheel game utilizing the rotor wheel 400 might only involve one of center rotation or rotor rotation. Alternatively, the wheel game may involve some combination of center rotation and rotor rotation. Since the three different rotor faces 430 are selectively displayed to the player, there are three different presentations of the faces 430. One presentation of the faces may involve indicia on the rotor faces 430 that indicates an award amount to potentially be won if the corresponding rotor segment 402 is indicated as the winner by the award indicator 426. A different one of the presentation faces may involve a cohesive image comprised of individual images on each of the rotor faces 432 associated with that presentation. Each of the three presentation faces may be associated with a different color. Some of the presentation faces may be mirrored. One or more of the rotor faces 430 of each rotor segment 402 may have an attached display capable of displaying an image.

Each of the three presentations of the rotor faces 430 may be associated with a different tier of awards, such that the award amounts indicated on the lowest tier presentation are less than the award amounts indicated on the highest tier presentation. The range of the awards of the three different presentations may overlap, for example the lowest tier may be from 10-200 credits, the middle tier from 100-2,000 credits, and the highest tier from 1,000-20,000 credits. Preferably, the three award amounts associated with the faces 430 of a particular rotor segment 402 are also tiered, for example 40, 400 and 4,000. Also preferable is that the proportions of the tiered awards on the faces 430 of each rotor segment 402 are the same (for example, 1:10:100). Rotor rotation in this different award tier embodiment may increase anticipation of the player. The rotor rotation and the center rotation may both occur in a predetermined manner in response to a single game event culminating in the player winning the award shown by the face 430 of the rotor segment 402 in alignment with the award indicator 426 when the rotations have been completed. Either the rotor rotation or the center rotation may be associated with different events occurring on a main game of the EGM. For example, one event of a main game (such as designated scatter symbols appearing on a payline) may trigger the rotor rotation to change an award tier of the rotor faces 430 presented to the player. A different event of the main game may trigger the center rotation. In embodiments where the center rotation and rotor rotation are triggered by different game events, either type of rotation may culminate in an award, or only one type of rotation may culminate in an award while the other type of rotation does not. For example, an embodiment in which the rotor rotation increases the award tier without culminating in an award will cause increased anticipation for a center rotation that culminates in an award being issued.

Another example of game play with the rotor wheel 400 involves rotor rotation without a corresponding center rotation. Upon a triggering event, the rotor rotation could be initiated such that rotor faces 432 are presented to the player in quick succession, with the player being presented with the opportunity to win one of three different award amounts indicated by the different indicia of the rotor faces 430 on the one rotor segment 402 that is aligned with the award indicator 426. A variation of this example would be to initiate the center rotation first, and then to cause a rotor rotation after the center rotation has been completed. One way to cause heightened anticipation is to cause the center rotation with the lowest tier award presentation of the three presentations facing the player, and after the center rotation has completed, occasionally and rarely causing the rotor rotation, possibly culminating in one of the other two higher tier award faces presented to the player, and of course awarding the player the amount indicated on the newly presented rotor face 430. Alternatively the rotor rotation could always follow the completion of the center rotation with the resulting tiered award presentation being dependent upon different probabilities (ex., the lowest tiered award presentation is the result 80% of the time, the middle tier award presentation is the result 19% of the time, and the highest tier award presentation is the result 1% of the time). Another variation of game play involves the rotor rotation occurring and completing before the center rotation starts, or in between the start and finish of the center rotation.

A typical way in which anticipation is built in standard wheel games is to cause the wheel to make several revolutions over an extended period of time, such as 10 seconds. During this conventional center rotation the player has full visibility of the award indicia printed on the segments and is hoping the highest award segment will be indicated as the amount won. During center rotation without rotor rotation of the rotor wheel 400, the player also has full visibility of the award indicia on the faces 432. However, the player may lose visibility of the award indicia during center rotation if rotor rotation is also occurring. Rotor rotation that occurs during center rotation is preferably therefore quickly performed, and only enough to rotate the rotor segments 120 degrees in either direction to quickly display the new award tier presentation. This allows the player to quickly focus on the newly presented set of award indicia of the new presentation. In the absence of center rotation, the rotor rotation may be prolonged as a way to build anticipation of winning an award from the highest award tier presentation, without the aforementioned concern of the player loosing track of the award indicia.

Other embodiments of the rotor wheel 400 involve the rotor segments 402 having only two faces 430 instead of three. The rotor segments 402 may be formed having a thin cross-section in the two-faced embodiment, allowing the player to see past the rotor segments 402 when the rotor segments 402 are rotated ninety degrees from the orientation in which the faces 430 are presented to the player. This allows for the opportunity to create an additional visual effect by either having a mirrored surface on the portion of the containment chassis 414 that the player can view between the rotor segments 402 or even mounting a display device to the containment chassis 414 behind the rotor segments 402.

Other embodiments of the rotor wheel 400 involve the rotor segments 402 rotating at different speeds during rotor rotation or even rotating in different directions during rotor rotation. The rotor segments 402 may rotate at different speeds by having differently sized threaded shafts 404. For example, a small shafted rotor segment 402 might rotate past two faces for every one face rotation of a larger shafted rotor segment 402. Some of the rotor segments 402 could rotate in different directions during rotor rotation by adding a second pinion gear proximal to the threaded shafts 404 and connected to the (first) pinion gear 452 by a shaft. Adjacent ones of the threaded shafts 404 could be alternatively offset proximally or distally such that they mesh with only one of the first or second pinion gears. Other embodiments of the rotor wheel 400 may involve one or more rotor segments that are not connected to the pinion gear 452 and which always display the same face 432 to the player.

Leaf Wheel

A third embodiment of the improved wheel device is described below as leaf wheel 500 with reference to FIGS. 12-18. Leaf wheel 500 is composed of a stationary outer chassis 502 within which a rotation assembly 504 is positioned and rotatable with respect to the outer chassis 502. The rotational assembly 504 is comprised of three major subassemblies: a central hub assembly 506, a short armed activation unit 508 and a long armed activation unit 510. A plurality of foldable segments 512 are attached to and associated with the short armed activation unit 508. Likewise, a plurality of foldable segments 514 are attached to and associated with the long armed activation unit 510. Each set of the foldable segments 512 and 514 may alternately be in an open display state or a closed folded state. When the foldable segments 512 are in the open state, the foldable segments 514 are in the folded state. Likewise, when the foldable segments 514 are in the open state, the foldable segments 512 are in the folded state. Each set of foldable segments 512 and 514 may have indicia printed there upon to indicate a prize or amount of credits to be potentially won by the player. The indicia are visible only when the foldable segments 512 or 514 are in the open display state. Since the two sets of foldable segments 512 and 514 represent two different presentation states of the leaf wheel 500, many of the game play ideas previously discussed in relation to the rotor wheel embodiment are applicable to the leaf wheel embodiment as well.

The central hub assembly 506 is comprised of a cylinder portion 516 within which is mounted a motor 518. Extending distally from the motor 518 is a shaft 520. The shaft 520 is dual threaded (dual threading not shown), with a proximal portion 522 of the shaft 520 being threaded in one direction and a distal portion 524 of the shaft 520 being threaded in the other direction. Attached to a proximal side of the cylinder portion is a decorative cap 526 which conceals the motor 518 from view by the player. A plurality of guide walls 528 are attached to and extend radially from an exterior surface of the cylinder portion 516. The guide walls 528 extend from approximately a mid-length area of the cylinder portion 516 and distally beyond a distal portion of the cylinder portion 516. Adjacent guide walls 528 are slightly spaced apart such that there is an opening, or slit 530 in between adjacent guide walls 528. The slits 530 extend from the distal end of the cylinder portion 516 to the distal ends of the guide walls 528.

Figure 16:
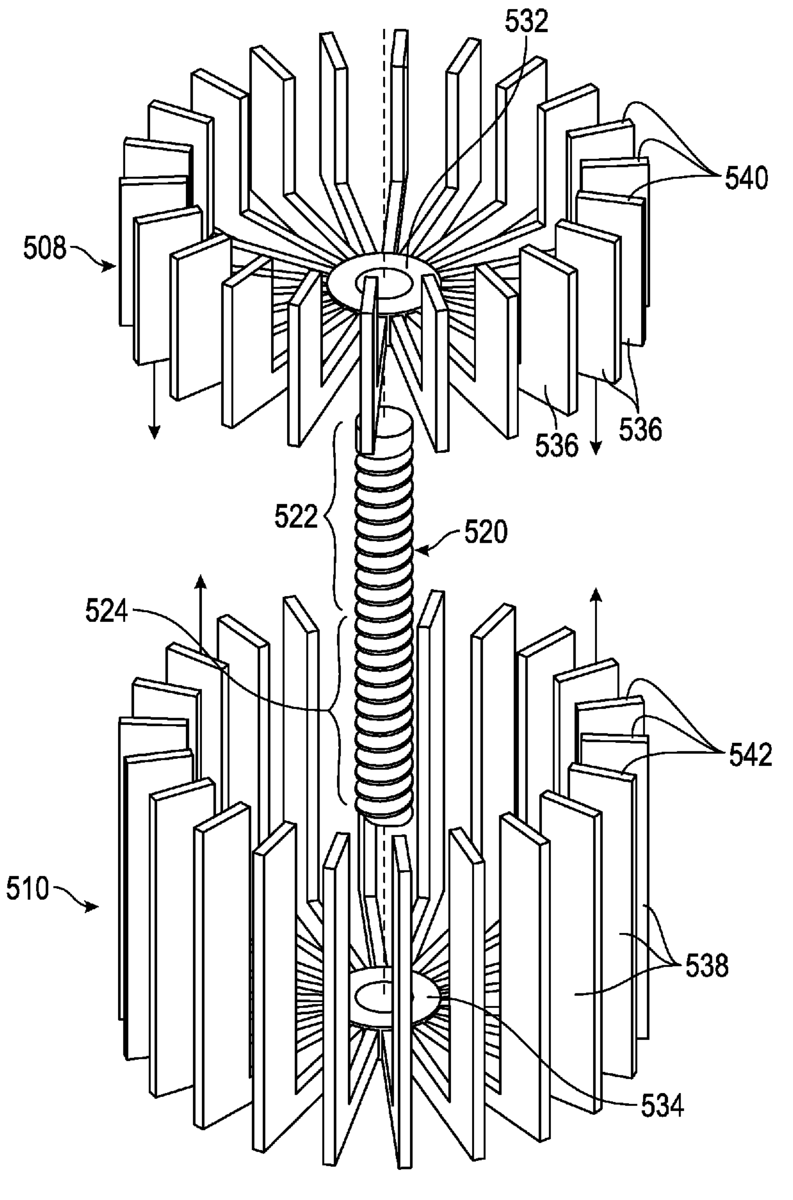
Figure 17:
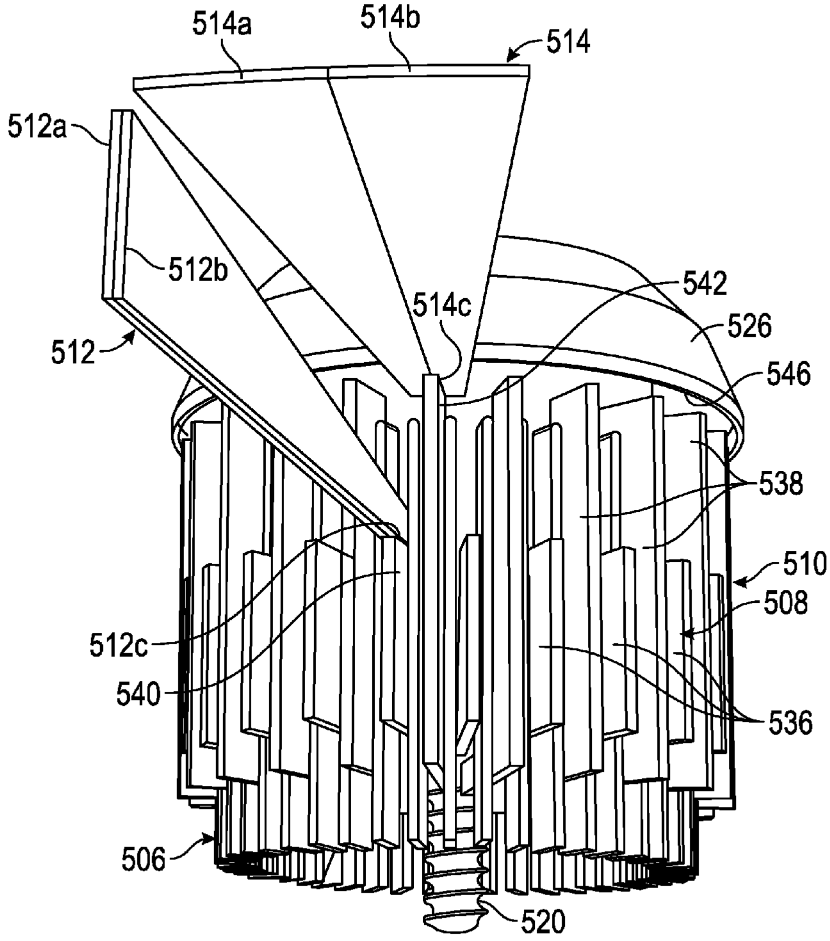
Figure 18:
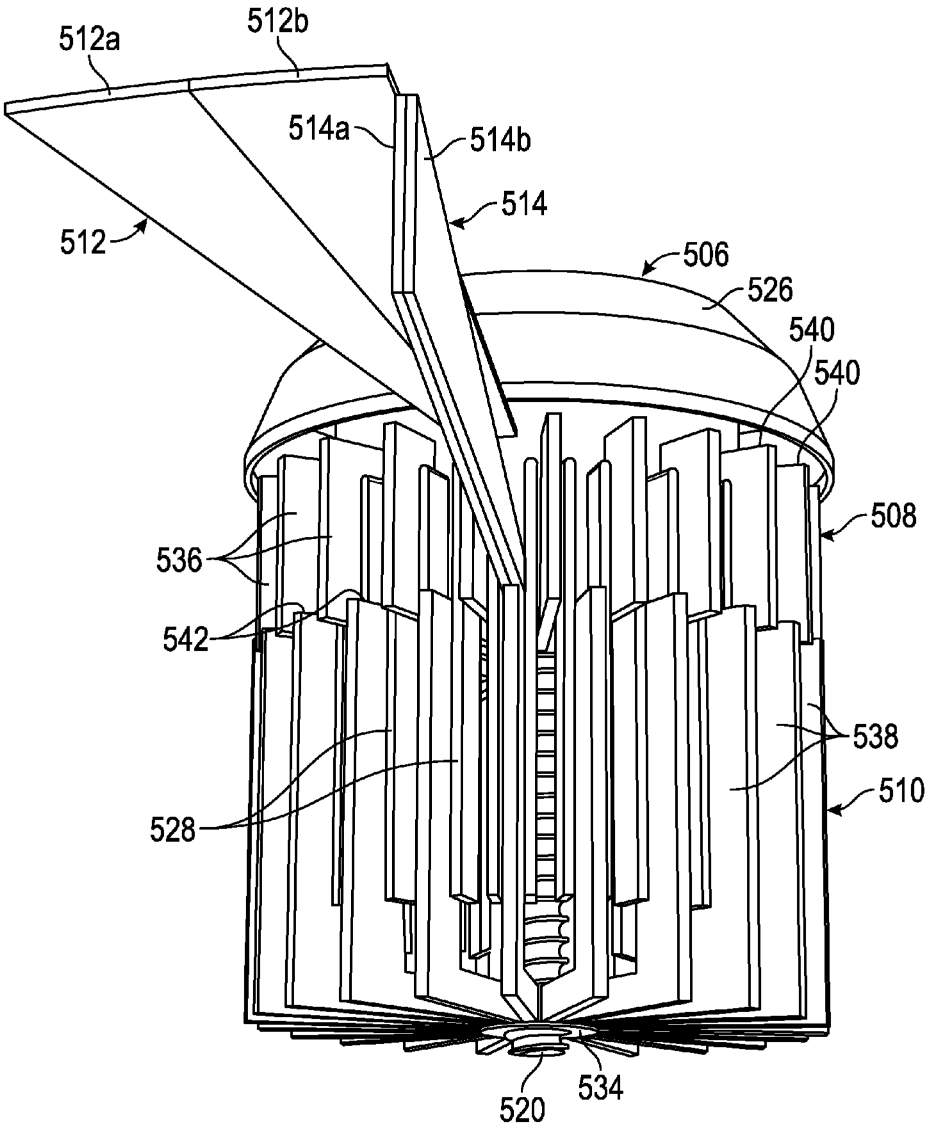

Each of the short armed activation unit 508 and the long armed activation unit 510 are composed of a threaded ring 532 and 534, respectively, to which a plurality of short arms 536 and long arms 538 are respectively attached as shown in FIG. 16. The threaded ring 532 has threads matching the proximal portion 522 of the shaft 520 and is screwed thereon. The threaded ring 534 has threads matching the distal portion 524 of the shaft 520 and is screwed thereon. The short armed activation unit 508 is thus positioned proximally of the long armed activation unit 510. Due to the activation units 508 and 510 being associated with different portions 522 and 524 of the dual threaded shaft 520, operation of the motor and spinning of the shaft 520 in one direction causes the activation units 508 and 510 to move away from one another, while operation in the other direction causes the activation units 508 and 510 to move towards one another. The orientation of the activation units 508 and 510 when they are closest to one another is shown in FIG. 17. The orientation of the activation units 508 and 510 when they are farthest from one another is shown in FIG. 18. Each of the short arms 536 and the long arms 538 are positioned within a separate slit 530 of the central hub assembly 506. The short arms 536 and the long arms 538 are alternately interspaced within the slits 530.

Each foldable segment 512 is composed of two symmetrical foldable half segments 512*a* and 512*b* which are connected at a living hinge 512*c*. A portion of each living hinge 512*c* is further hingeably attached to a proximal end 540 of one of the short arms 536, as shown in FIGS. 17 and 18. Likewise, each foldable segment 514 is composed of two symmetrical foldable half segments 514*a* and 514*b* which are connected at a living hinge 514*c*. A portion of each living hinge 514*c* is further hingeably attached to a proximal end 542 of one of the long arms 538, as shown in FIGS. 17 and 18.

When the short armed activation unit 508 is moved distally from its proximal-most position (FIG. 18), a distal inner edge of each foldable half segment 512*a* and 512*b* contacts a proximal end 544 of the guide walls 528 on either side of the short arm 536 that is connected to the foldable half segments 512*a* and 512*b*. Further distal movement of the unit 508 results in the half segments 512*a* and 512*b* folding inward due to being deflected by the proximal ends 544 of the guide walls 528 until the foldable half segments 512*a* and 512*b* are folded together as shown in FIG. 17. The foldable half segments 512*a* and 512*b* each have a thickness that is one half the thickness of the short arms 536, such that the thickness of the folded segment 512 is comparable to the thickness of the short arms 536. This comparable thickness both keeps the half segments 512*a* and 512*b* pressed against one another when between adjacent guide walls 528 and yet allows each folded segments 512 to move within the channel or space between the adjacent guide walls 528.

In the absence of any force acting on the foldable half segments 512*a* and 512*b*, the foldable half segments 512*a* and 512*b* assume a half opened position due to an intended bias of the living hinge 512*c*. When the short armed activation unit 508 is moved proximally from its distal-most position (FIG. 17), the foldable half segments 512*a* and 512*b* eventually clear the proximal ends 544 of the guide walls 528. When the foldable half segments 512*a* and 512*b* have cleared the guide walls 528, the foldable half segments 512*a* and 512*b* assume the half opened position due to the bias of the living hinge 512*c*. Continued proximal movement of the activation unit 508 causes proximal edges of the half segments 512*a* and 512*b* to eventually contact an annular portion 546 of the decorative cap 526 while the foldable half segments 512*a* and 512*b* are in the half opened position. Further continued proximal movement of the activation unit 508 causes the foldable half segments 512*a* and 512*b* to assume the fully opened position due to the deflection of the proximal edges of the foldable half segments 512*a* and 512*b* by the annular portion 546 of the decorative cap 526. This operation of the short armed activation unit 508 and attached foldable segments 512 also applies to the long armed activation unit 510 and its attached foldable segments 514.

Figure 12:
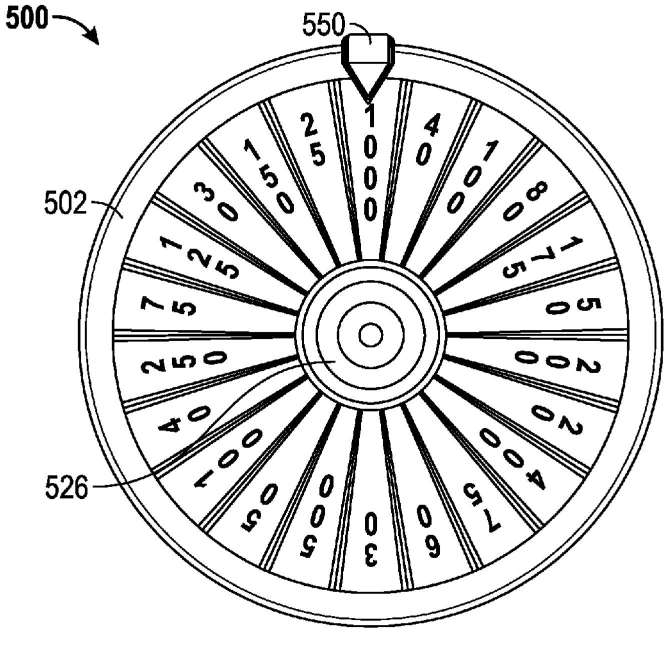
FIGS. 12-18 relate to a leaf wheel apparatus for an EGM according to an exemplary embodiment.
Figure 13:
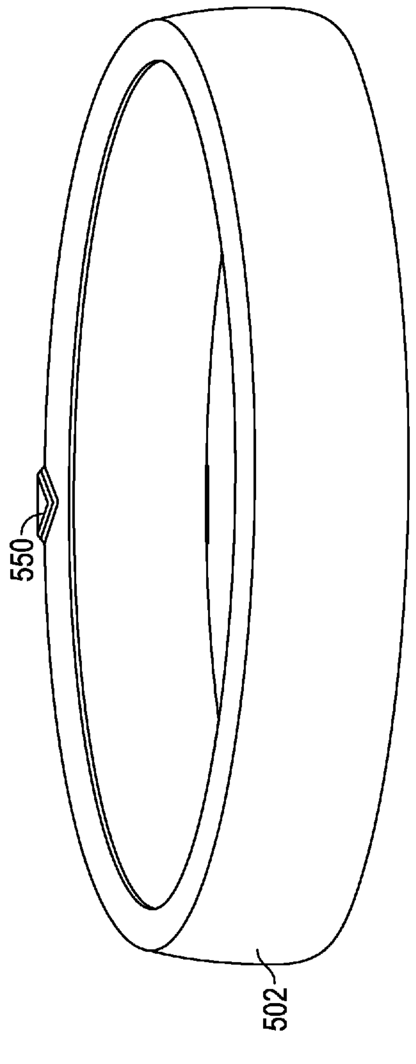
Figure 14:
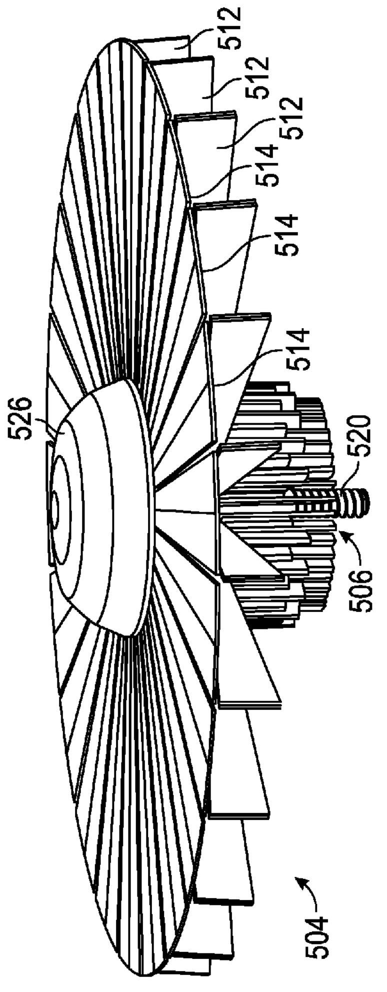
Figure 15:
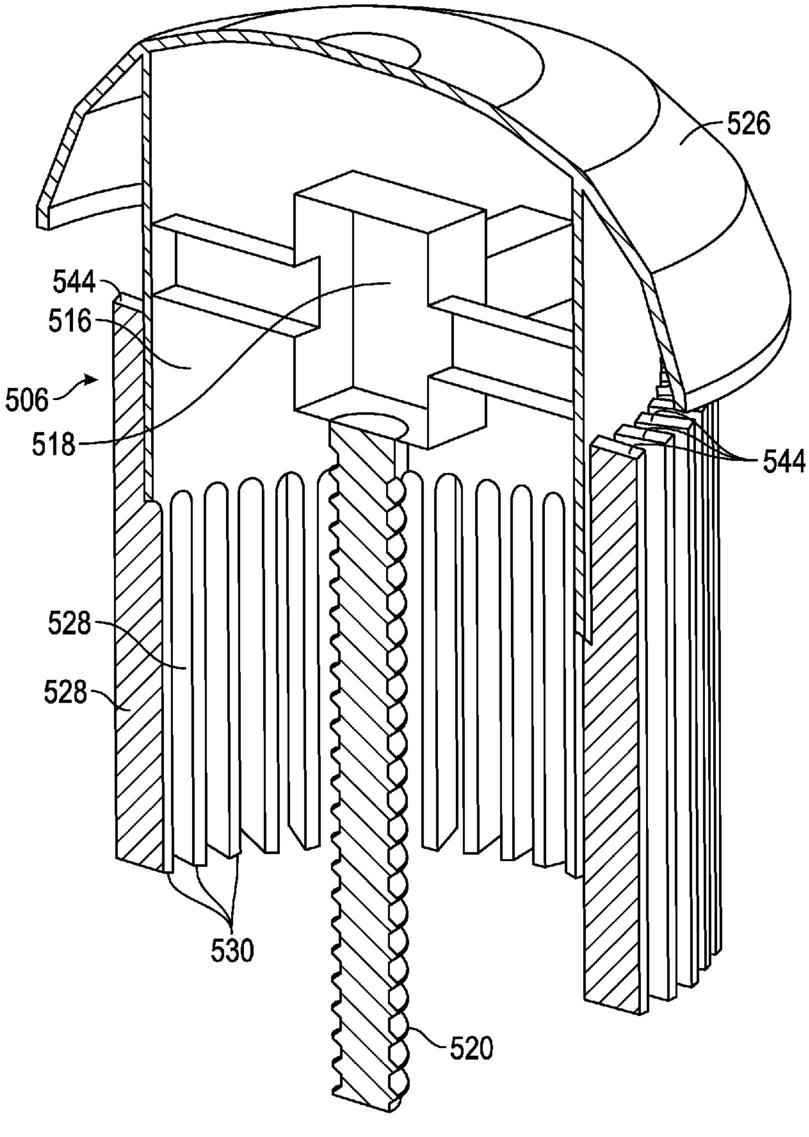

As should be appreciated at this point, the transition from one of the presentations to the other involves the simultaneous folding of one set of foldable segments 512 or 514 and the opening of the other set of foldable segments 512 or 514. The positioning of the annular portion 546 of the decorative cap 526 from the proximal ends 544 of the guide walls 528 as well as the spacing of the two activation units 508 and 510 when at their greatest separation (FIG. 18) are important in ensuring that there is no interference between adjacent ones of the foldable segments 512 and 514 of the different activation units 508 and 510. As shown in FIG. 12, there may be some spacing between adjacent foldable segments 512 or 514 while in the open orientation such that portions of the other set of foldable segments 512 or 514 are visible there through. Alternately, the spacing may be such that there is no discernable gap between adjacent ones of the foldable segments 512 or 514 when in the open orientation.

Outer ends of the foldable segments 512 and 514 may be free floating, or alternately may contact an inner protruding lip 548 of chassis 502 in which the rotational assembly 504 is positioned. Although the radial length of the arms 536 and 538 and associated hinges 512*c* and 514*c* are shown as relative short compared to the radial lengths of the foldable segments 512 and 514 themselves, they may be elongated for greater stability.

It is contemplated that the distal portion of the guide walls 528 may be firmly connected together and further connected to a gear ring, shaft or similar device for causing the relative rotation of the rotational assembly 504 with respect to the chassis 502, in a manner similar to that as previously described for either of the previous two wheel embodiments. It is most likely that a slip ring would need to be used in this embodiment to supply power to the motor 518. An indicator 550 affixed to the chassis 502 indicates the award won by the play from play of the wheel game as described in relation to the rotor wheel embodiment.

Iris Wheel

Figure 19A:
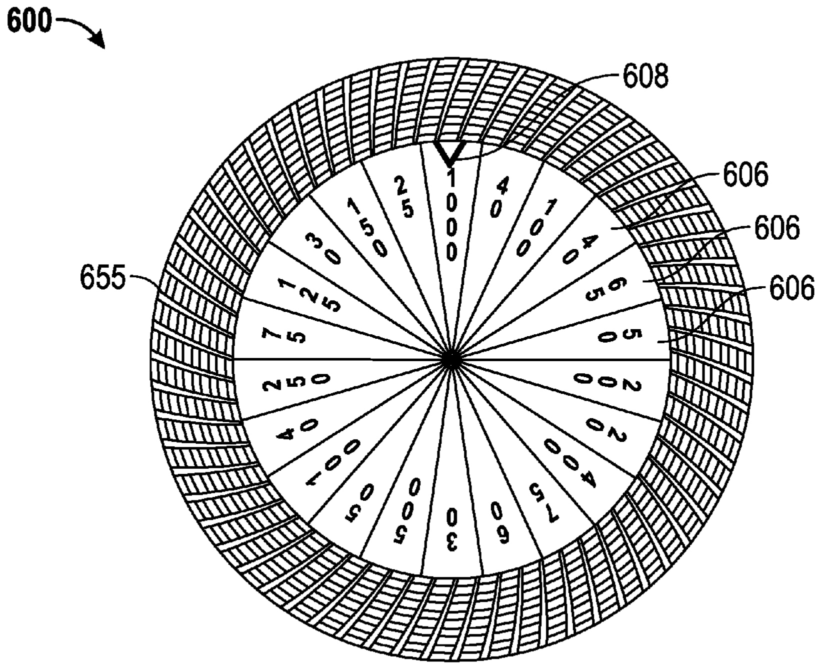
FIGS. 19A, 19B, and 20-30 relate to an iris wheel apparatus for an EGM according to an exemplary embodiment.
Figure 19B:
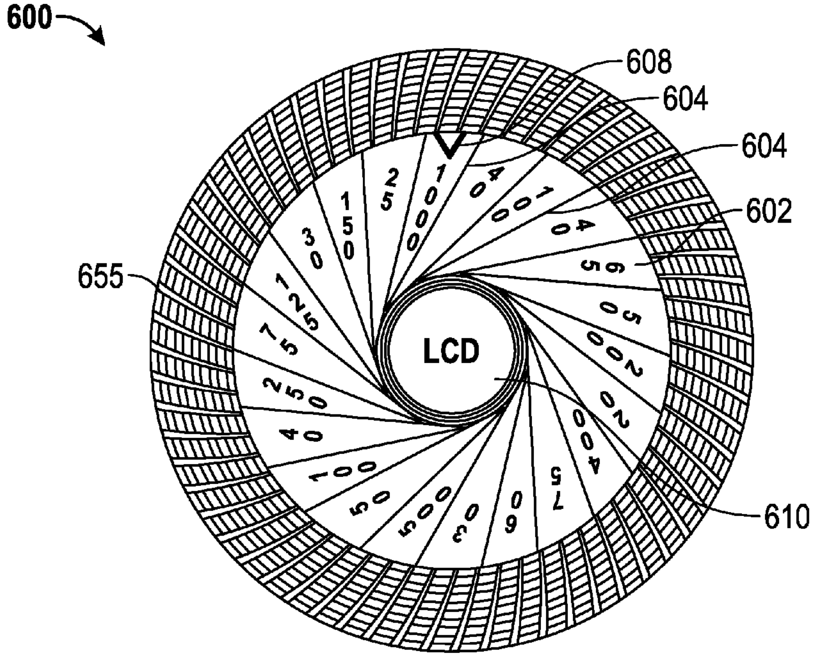
Figure 20:
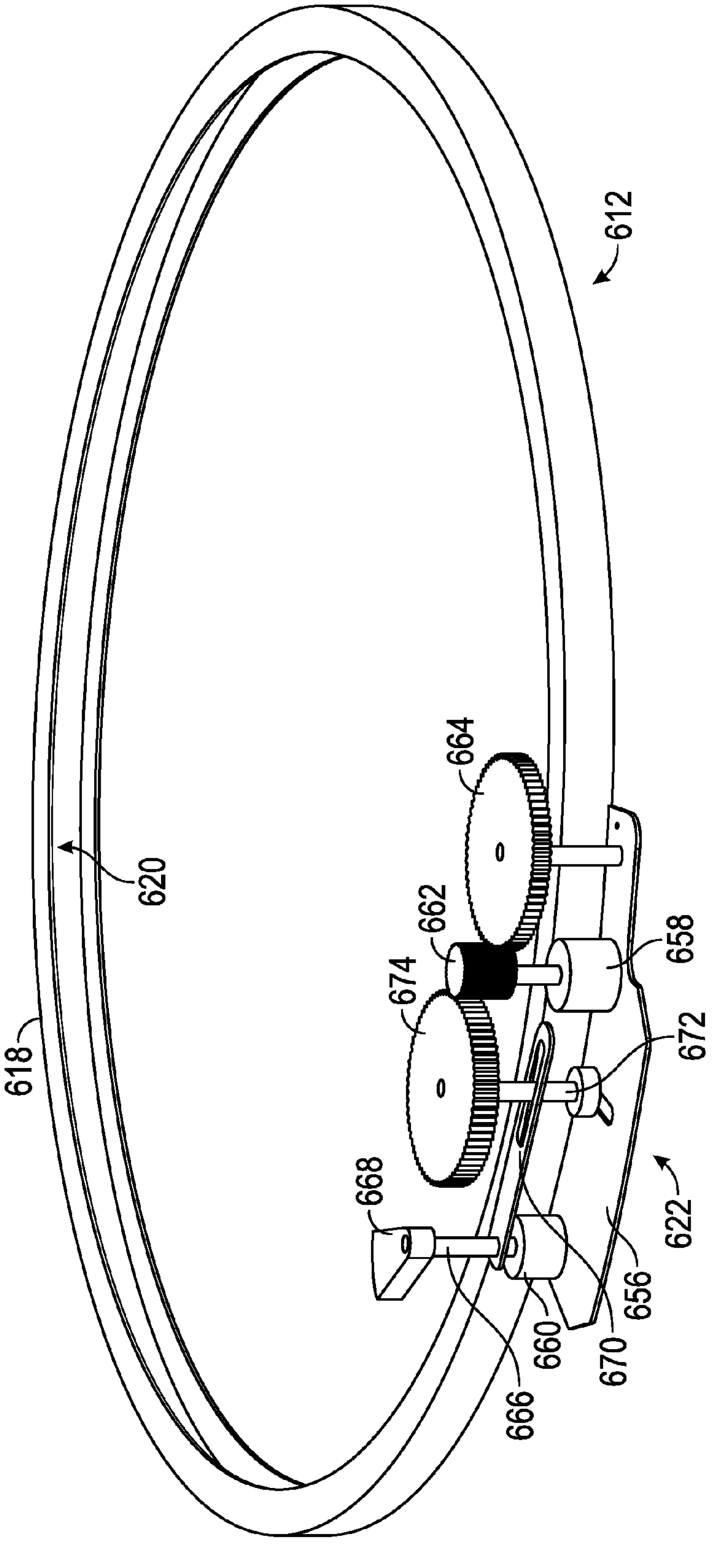

A fourth embodiment of the improved wheel device is described below as iris wheel 600 with reference to FIGS. 19A, 19B and 20-30. Iris wheel 600 is composed of a plurality of wedge-shaped segments 602 having a relatively thin uniform thickness. A proximal side of each segment 602 has a dividing line 604 formed or printed thereon that creates the appearance that each segment 602 is two side by side smaller segments ("subsegments 606"). Both subsegments 606 of each segment 602 have award indicia formed thereon that indicates an amount of credits to be won if the subsegment 606 is indicated as the winning subsegment 606 during play of the wheel game. The wheel game may involve the segments 602 maintaining a temporarily fixed relationship with each other as shown in FIG. 19A while rotating about a center axis of the iris wheel 600 ("center rotation"). In a fashion similar to that previously described with regard to the other wheel device embodiments, the player may be awarded the number of credits indicated by the indicia on the subsegment 606 that is in alignment with an indicator 608 when the segments 602 stop rotating. In addition to rotation of the segments 602, the wheel game may also involve the segments 602 moving with respect to each other in the manner of an iris mechanism to reveal a display screen 610 positioned within the center of the iris wheel 600, as shown in FIG. 19B ("iris activation").

Figure 21:
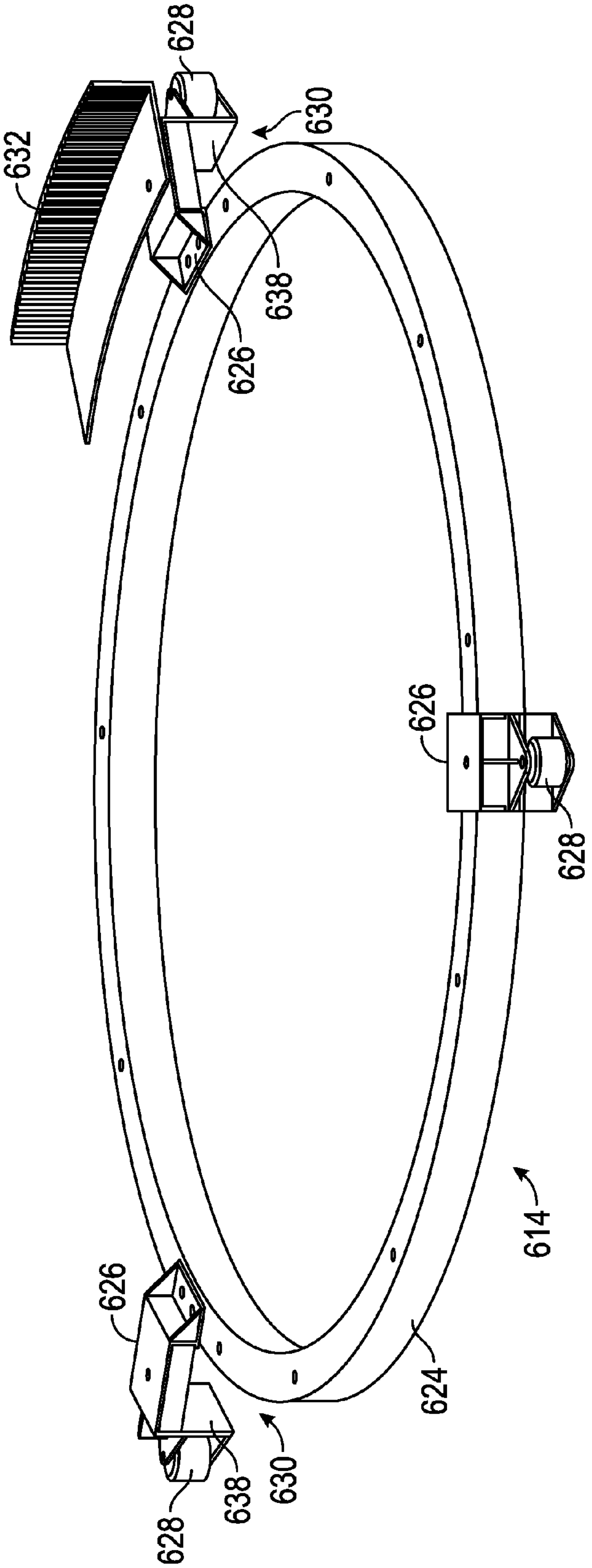
Figure 22:
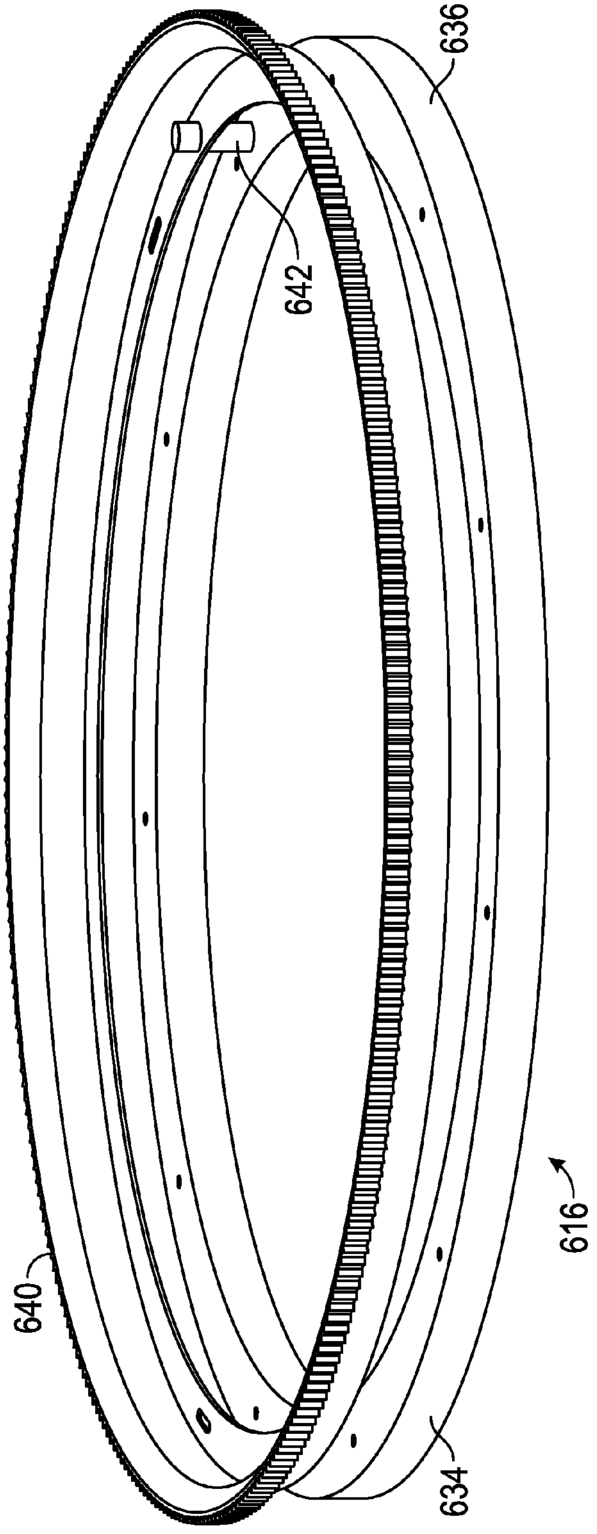

The major assemblies of the iris wheel 600 that facilitate both the center rotation and the iris activation are a base guide assembly 612 (FIG. 20), an inner ring assembly 614 (FIG. 21) and in outer ring assembly 616 (FIG. 22). The base guide assembly 612 remains stationary during both the center rotation and the iris activation and is envisioned as being rigidly attached to an EGM or topper. The base guide assembly 612 includes an annular guide 618 which has an inward facing C-shaped cross section. The annular guide 618 defines a ring-like trough 620 that faces inward. Attached to an outer portion of the annular guide 618 is an activation assembly 622. The operation of the activation assembly 622 will be described following the discussion below of the inner ring assembly 614, the outer ring assembly 616, and how both assemblies 614 and 616 interact with the segments 602.

The inner ring assembly 614 includes an inner ring 624 from which extend three equally spaced apart spacer mechanisms 626. A roller 628 is rotationally attached to the outer most portion of each spacer mechanism 626. The rollers 628 are centered within the same plane which defines a center of the inner ring 624. Each spacer mechanism 626 is attached to a distal side of the inner ring 624 from which the spacer mechanism 626 extends outward and then proximally. This shape of the spacer mechanism 626 defines a ring space 630 between the inner ring 624 and the rollers 628. The rollers 628 are positioned within the ring-like trough 620 of the annular guide 618 and roll along an inward facing surface of the annular guide 618. The spacer mechanisms 626 and the rollers 628 permit relative rotational movement of the inner ring assembly 616 and the base guide assembly 612 while also maintaining the inner ring 624 in a fixed axial position with respect to the annular guide 618. Rigidly attached to a distal side of the spacer mechanisms 626 is an inner ring gear 632 (only a portion of which is shown in FIG. 21). The activation assembly 622 interacts with the ring gear 632 to rotate the inner ring assembly 614 relative to the base guide assembly 612.

Figure 23:
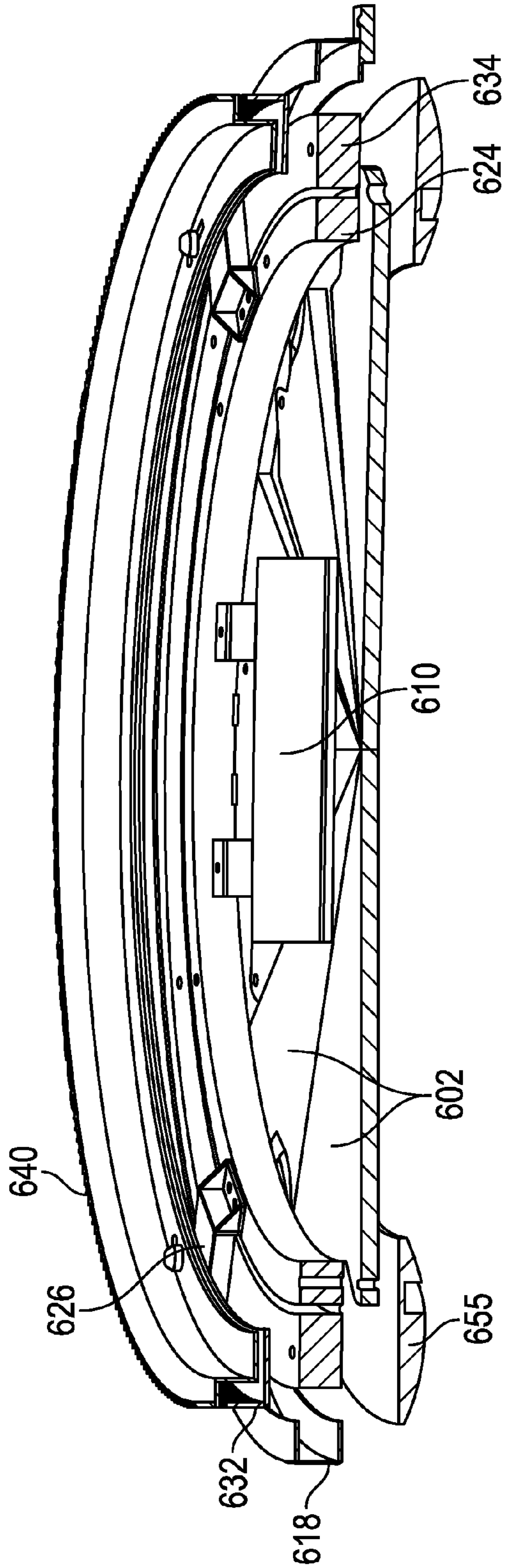
Figure 24:
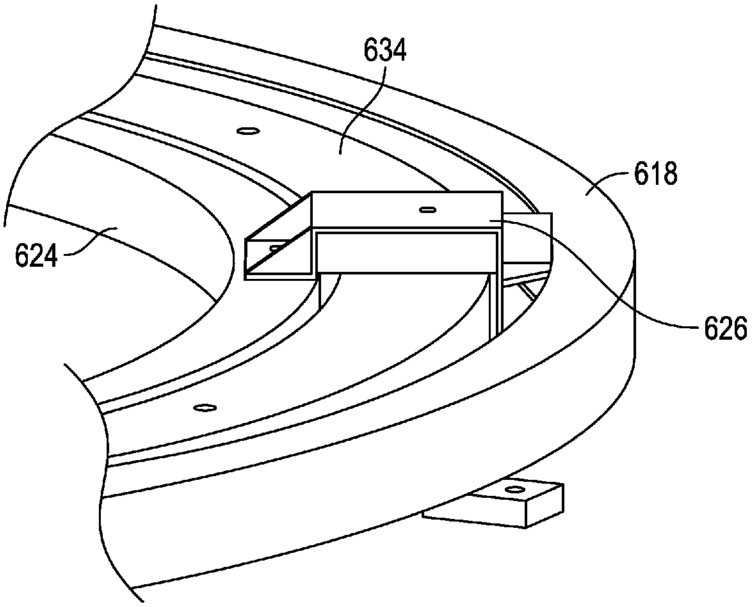

The outer ring assembly 616 includes an outer ring 634 which is positioned outwardly of and concentrically with the inner ring 624. The outer ring 634 fits within the ring space 630 defined by the spacer mechanisms 626. An outer most surface 636 of the outer ring 634 presses against a proximally facing surface 638 of the spacer mechanisms to maintain the outer ring 634 in concentric alignment with the inner ring 624. The spacer mechanism 626 or the outer ring 634 may be made from reduced friction material such that contact between the two does not inhibit the relative rotation of the inner ring 624 and the outer ring 634. An outer ring gear 640 is rigidly attached to a distal side of the outer ring 634 by a spacing peg 642. The spacing peg 642 maintains enough distance between the outer ring 634 and the outer ring gear 640 to allow the spacer mechanisms 626 and inner ring gear 632 to fit in between the outer ring 634 and the outer ring gear 640, as shown in FIG. 23. The spacing peg 642 passes through a slot (not shown) of the inner ring gear 632. The slot is long enough to allow for the contemplated amount of relative rotation between the inner ring assembly 614 and the outer ring assembly 616. The relative rotation of the outer ring assembly 616 and the base guide assembly 612 is caused by the activation assembly 622 acting on the outer ring gear 640. The relative positioning of the inner ring 624, the outer ring 634 and the annular guide 618 is shown in FIGS. 23 and 24.

Figure 25:
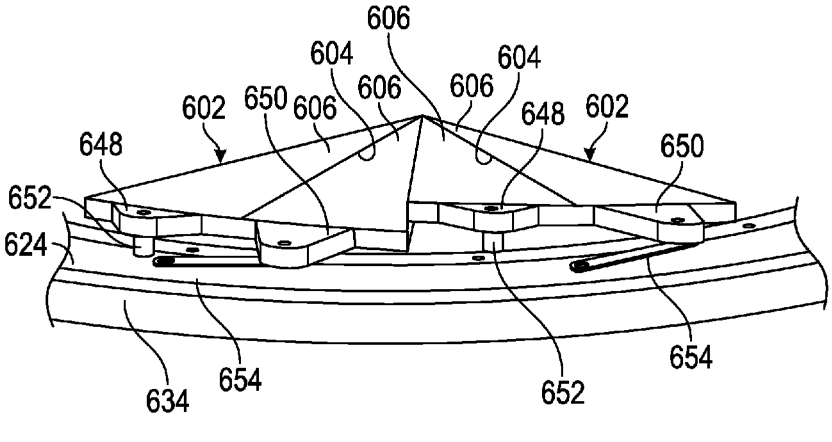

Each of the segments 602 is shaped similar to an isosceles triangle and has an inward facing tip 644 opposite from an outside edge 646, as shown in FIG. 25. Protruding outward from one half of the outside edge 646 is short control tab 648. Protruding outward from the other half of the outside edge 646 is a long control tab 650. Each short control tab 648 is rotationally connected to the inner ring 624 by a spacing element 652 which offsets the short control tab 648 from the inner ring 624 in the proximal direction. The spacing element 652 causes the outside edges 646 of adjacent segments 602 to be slightly offset from each other, as shown in FIG. 25. Each long control tab 650 is rotationally connected to a link 654 which is further rotationally connected to the outer ring 634.

Figure 26:
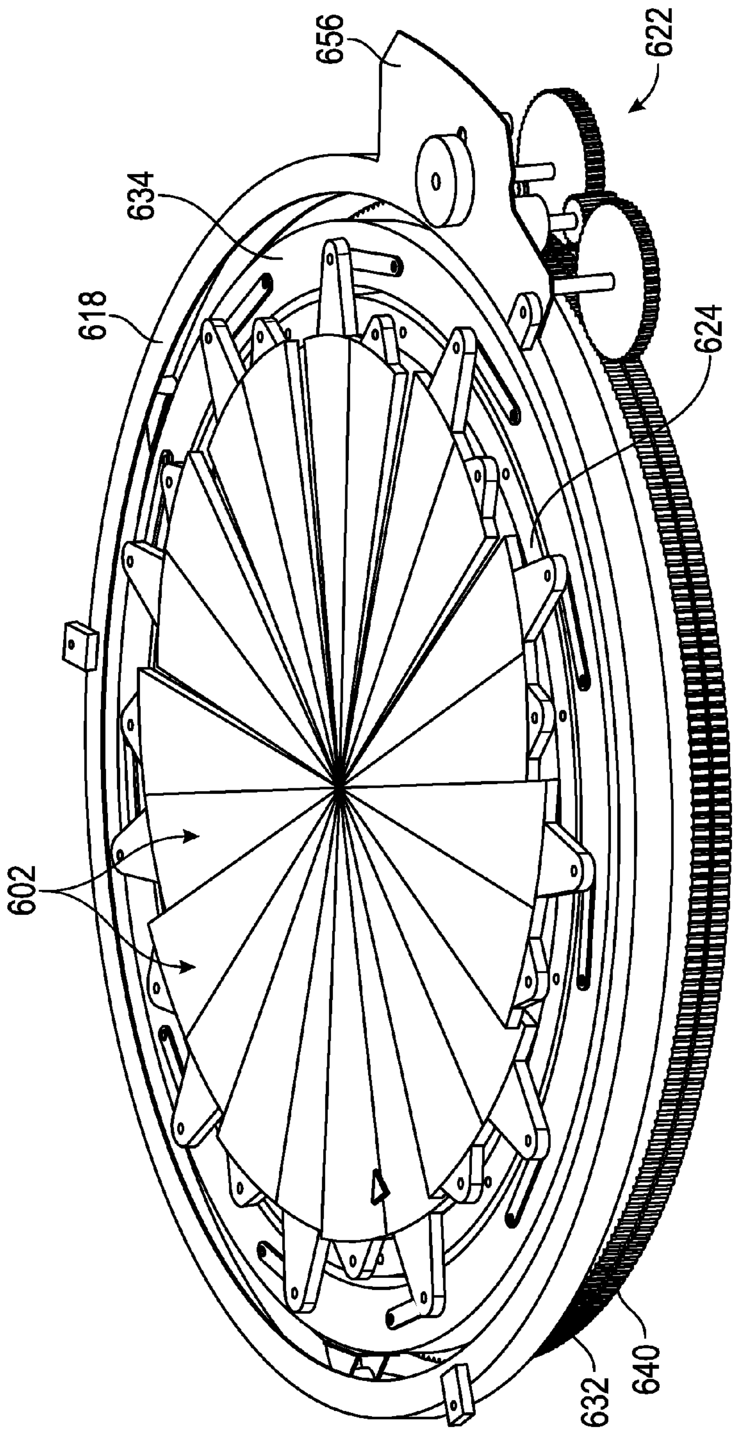
Figure 27:
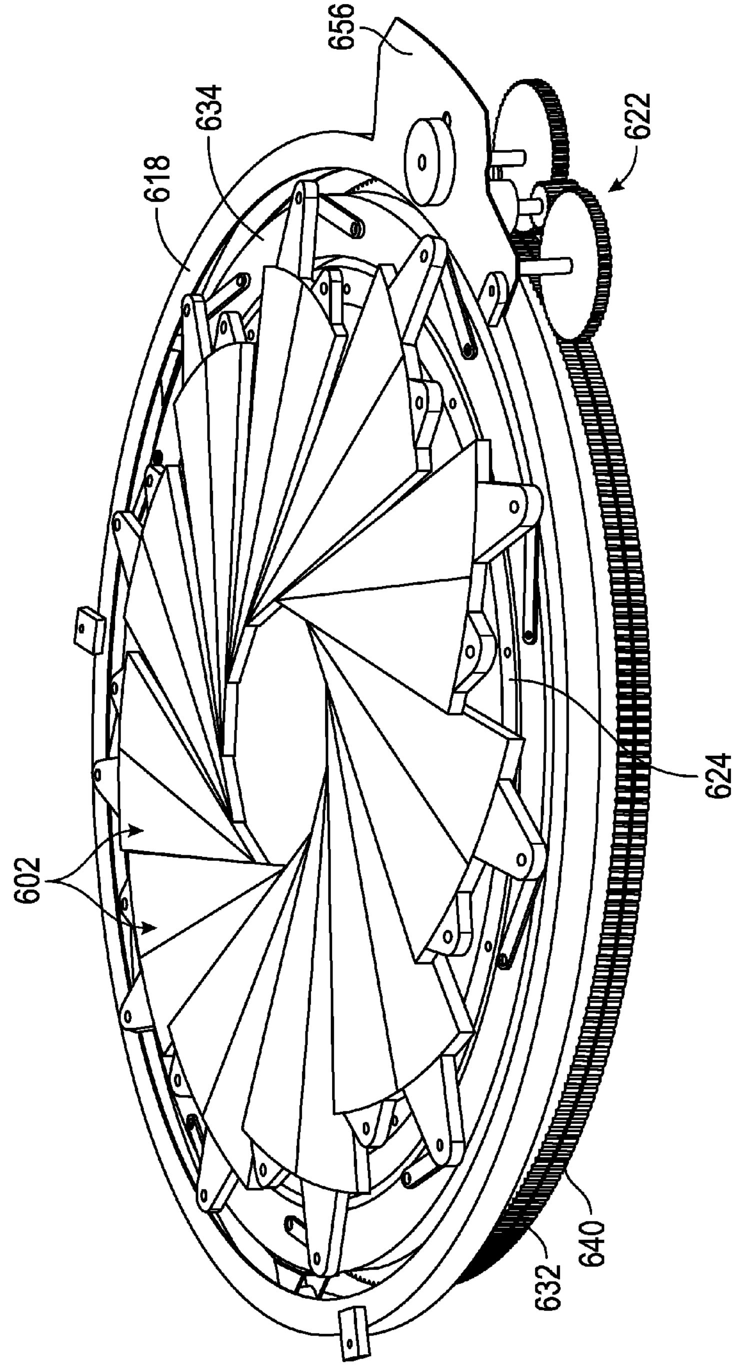
Figure 28:
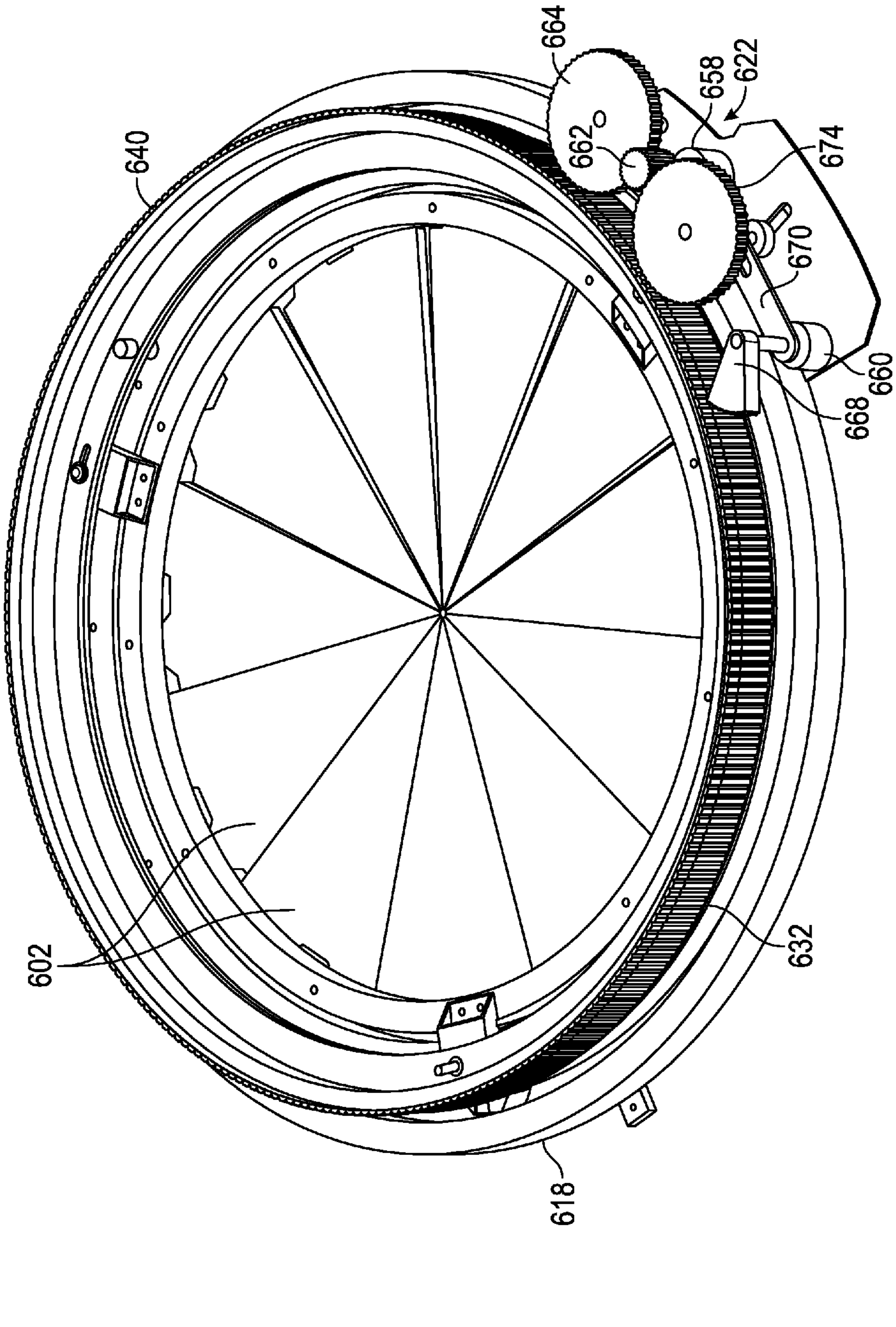
Figure 29:
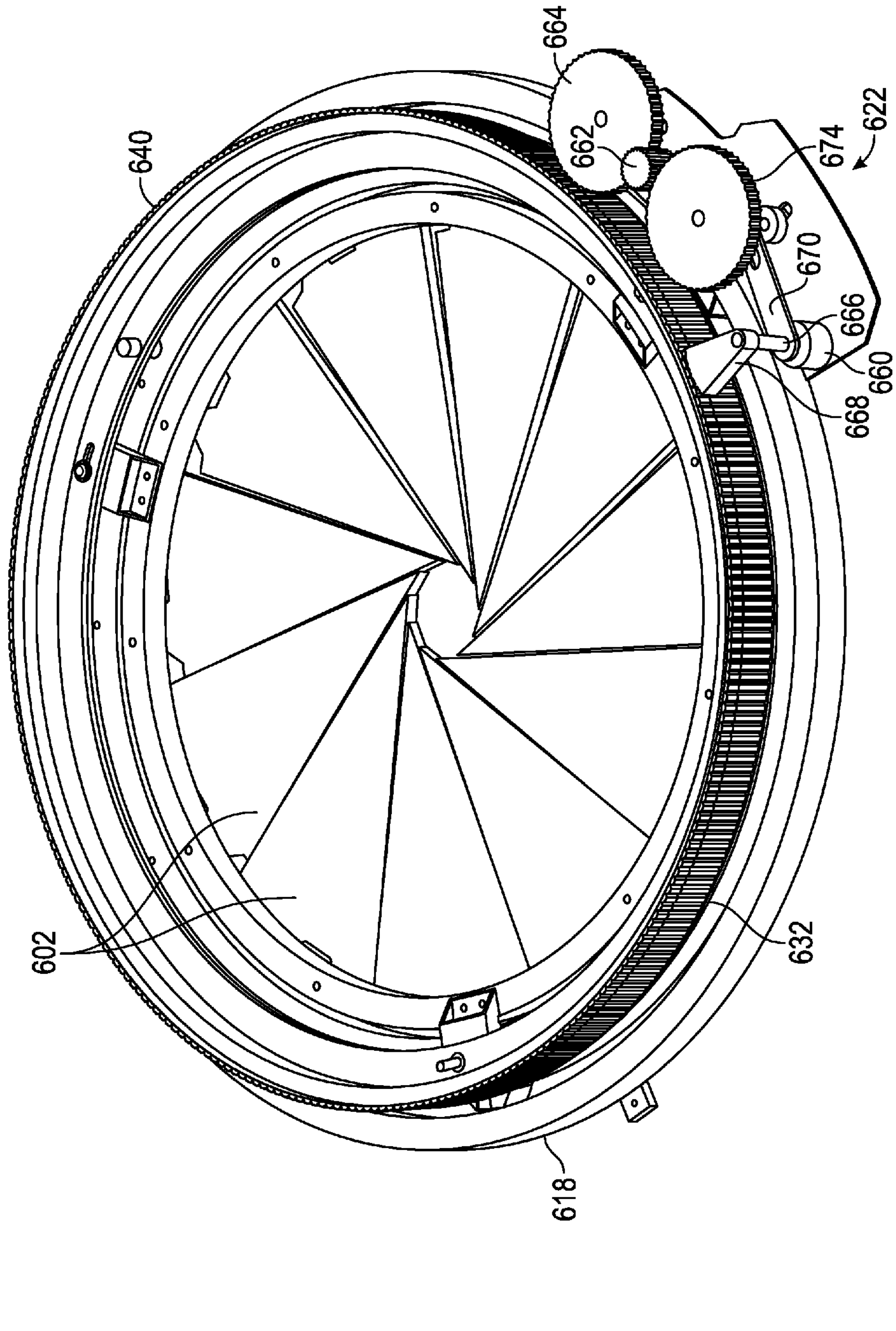

Clockwise relative movement (from the player's perspective) of the outer ring 634 with respect to the inner ring 624 results in the segments 602 opening in the iris like manner from a closed orientation shown in FIGS. 19A and 26 to an open orientation shown in FIGS. 19B and 27. The relative movement of the outer ring 634 with respect to the inner ring 624 causes each segment 602 to rotate about its short control tab 648 as a result of the long control tab 650 being pulled by the link 654. Counter clockwise relative movement of the outer ring 634 with respect to the inner ring 624 conversely results in the segments 602 closing to the closed orientation. As the segments 602 move into the open orientation from the closed orientation, there is a small amount of overlap between adjacent segments. The angular offset of the adjacent segments 602 caused by the spacing element 652 provides the clearance required for this slight overlap to occur. The mechanical details described above are obscured from the view of the player by a decorative cover 655 which mounts to the annular guide 618.

With reference to FIGS. 20 and 28-30, the activation assembly 622 includes a base plate 656 which is formed on and extends outwardly from the annular guide 618. Mounted on the base plate 656 is a center rotation motor 658 and an iris activation motor 660. The center rotation motor 658 directly drives a small middle gear 662. The middle gear 662 is engaged with a relatively larger inner ring drive gear 664 with is further engaged with the inner ring gear 632 of the inner ring assembly 614. The iris activation motor 660 directly rotates a shaft 666 to which is connected a sector gear 668 and a link 670. The link 670 is further connected to a moveable shaft 672 to which is connected an outer ring drive gear 674. The outer ring drive gear 674 is of a similar size and tooth count to that of the inner ring drive gear 664. The moveable shaft 672 is moveable between an inner most orientation shown in FIG. 28, a mid-way orientation shown in FIG. 29, and an outer most orientation shown in FIG. 30, by operation of the iris activation motor 660. The outer ring drive gear 674 is engaged with both the middle gear 662 and the outer ring gear 640 when the moveable shaft 672 is in its inner most orientation and is disengaged when the moveable shaft 672 is in the mid-way and outer most orientations.

Center rotation of the iris wheel 600 is accomplished by the activation of the center rotation motor 658 when the moveable shaft 672 is in the inner most orientation and the iris is closed. In this orientation, the middle gear 662 rotates both the inner ring drive gear 664 and the outer ring drive gear 674, which in turn causes the synchronized rotation of both the inner ring assembly 614 and the outer ring assembly 616. The iris activation is accomplished by activating the iris activation motor 660 while the center rotation motor 658 is inactive. Since the center rotation motor 658 is inactive during the iris activation, all of the middle gear 662, the inner ring drive gear 664 and the inner ring assembly 614 remain stationary. As previously mentioned, the iris activation is caused by the relative rotation of the inner ring 624 and the outer ring 634. Thus, with the inner ring 624 stationary, the relative movement must come about by the rotation of the outer ring 634. The activation of the iris activation motor 660 causes the link 670 to move the moveable shaft 672 outwardly which causes the outer ring drive gear 674 to become disengaged from the outer ring gear 640. Soon after the outer ring drive gear 674 becomes disengaged from the outer ring gear 640, the sector gear 668 makes contact with and rotates the outer ring gear 640 as can be understood from FIGS. 29 and 30 to fully open the iris and make visible the display screen 610. The iris is closed by operating the iris activation motor 660 in the other direction to cause the sector gear 668 and the moveable shaft 672 to move from the orientations shown in FIG. 30, to that shown in FIG. 29, and finally to that shown in FIG. 28 at which point the iris is closed.

The iris activation and center rotation can be combined in various ways to enhance the presentation of the wheel game involving the iris wheel 600. Starting with the iris closed, the iris wheel 600 may be rotated and stopped as in the play of a conventional wheel game to indicate a winning award on one of the subsegments 606, followed by the iris opening, a celebratory display on the display screen, followed by the closing of the iris and the awarding of the credits corresponding to the winning award to the player. The celebratory display may include a number corresponding to the award amount. The celebratory display may include colors that complement or contrast with a color of the winning subsegment 606.

To create additional anticipation for the player, the iris may be opened before the center rotation of the wheel game to display on the display screen 610 a pre-game or a multiplier that will apply to the amount of the indicia on the winning subsegment 606. The iris may be opened or closed a plurality of times before or after the center rotation in conjunction with anticipation producing displays on the display screen 610 that may, or may not affect the eventual award won by the player. The display screen 610 may also display a video version of the wheel game instead of, or in conjunction with the center rotation of the iris wheel 600.

Although the activation assembly 622 shown and described does not permit the iris activation during center rotation, minor modifications to the activation assembly 622 could easily permit this, such as having independent motors for both the inner ring drive gear 664 and the outer ring drive gear 674.

Since the center rotation and the iris activation of the iris wheel 600 does not involve the rotation of any active conductors or magnetic fields, the iris wheel 600 does not produce additional problematic EM radiation beyond that produced by the stationary motors 658 and 660. The iris wheel 600 thus provides an advantageous enhancement to the traditional wheel game in the form of a pleasing visual effect of the iris activation without the drawbacks of additional EM radiation.

Expand Wheel

Figure 31A:
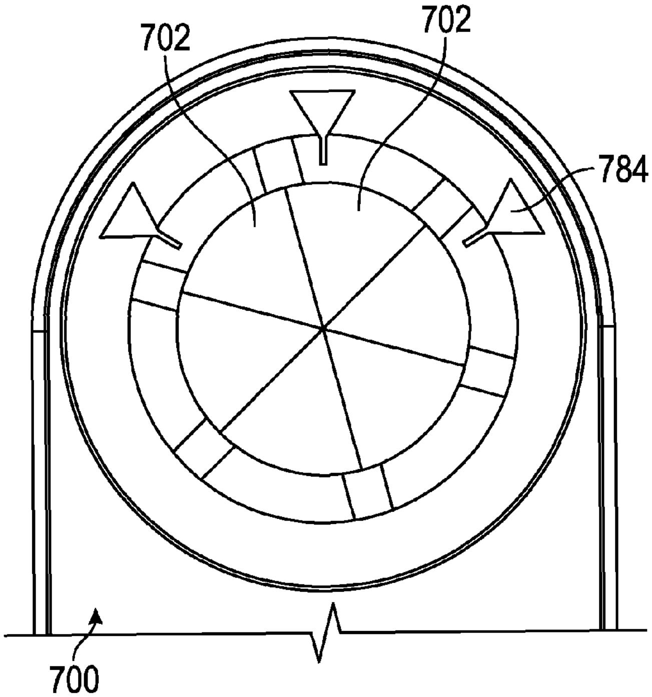
FIGS. 31A, 31B, and 32-40 relate to an expand wheel apparatus for an EGM according to an exemplary embodiment.
Figure 31B:
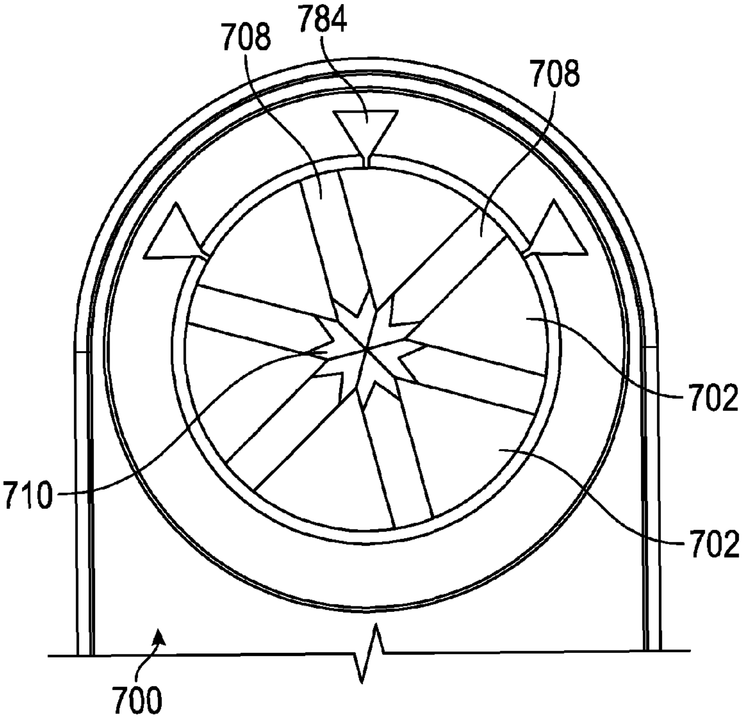
Figure 32:
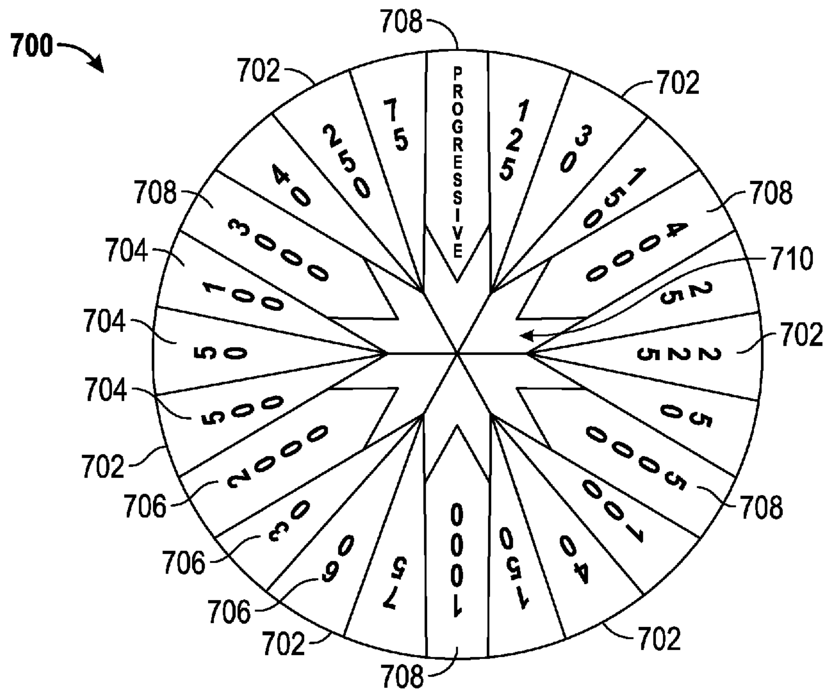
Figure 33:
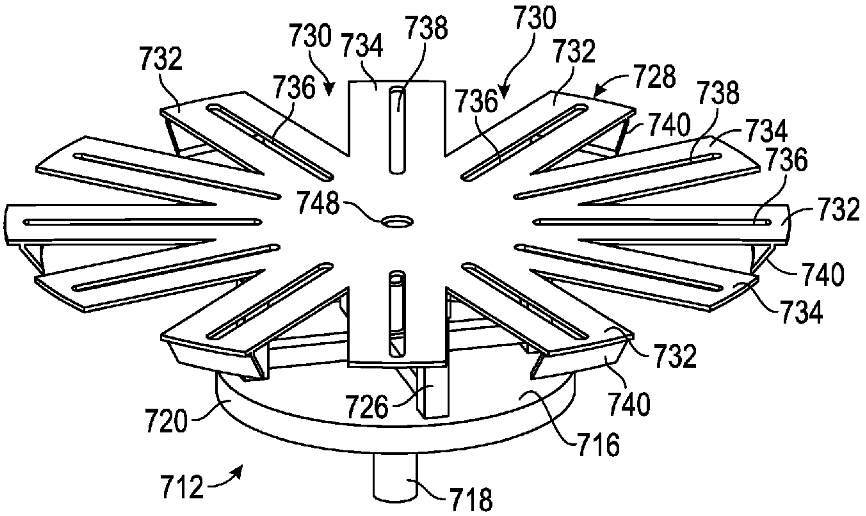

A fifth embodiment of the improved wheel device is described below as expand wheel 700 with reference to FIGS. 31A, 31B and 32-40. The expand wheel 700 is characterized as having both a contracted state (shown in FIG. 31A) and an expanded state (shown in FIG. 31B). A plurality of wedge-shaped segments 702 are positioned adjacent to one another in the contracted state with each segment 702 positioned adjacent to a center of the expand wheel 700. The segments 702 are each partitioned into multiple sub-segments 704 (shown in FIG. 32) each having indicia 706 printed or formed thereon indicating an award amount associated with the sub-segment 704. In the expanded state of the expand wheel 700, the segments 702 are separated from adjacent segments 702 by a gap piece 708 and are also displaced away from the center of the expand wheel 700 as shown in FIG. 31B. In the center of the expand wheel 700 in the expanded state is a star piece 710. Both the gap pieces 708 and the star piece 710 may also have award indicia 706 formed thereon.

There are two major structures that facilitate the transition between the contracted state and the expanded state of the expand wheel 700. The first of these structures is track structure 712 shown in FIG. 33. The second of these structures is link activation structure 714 shown in FIG. 34.

Figure 30:
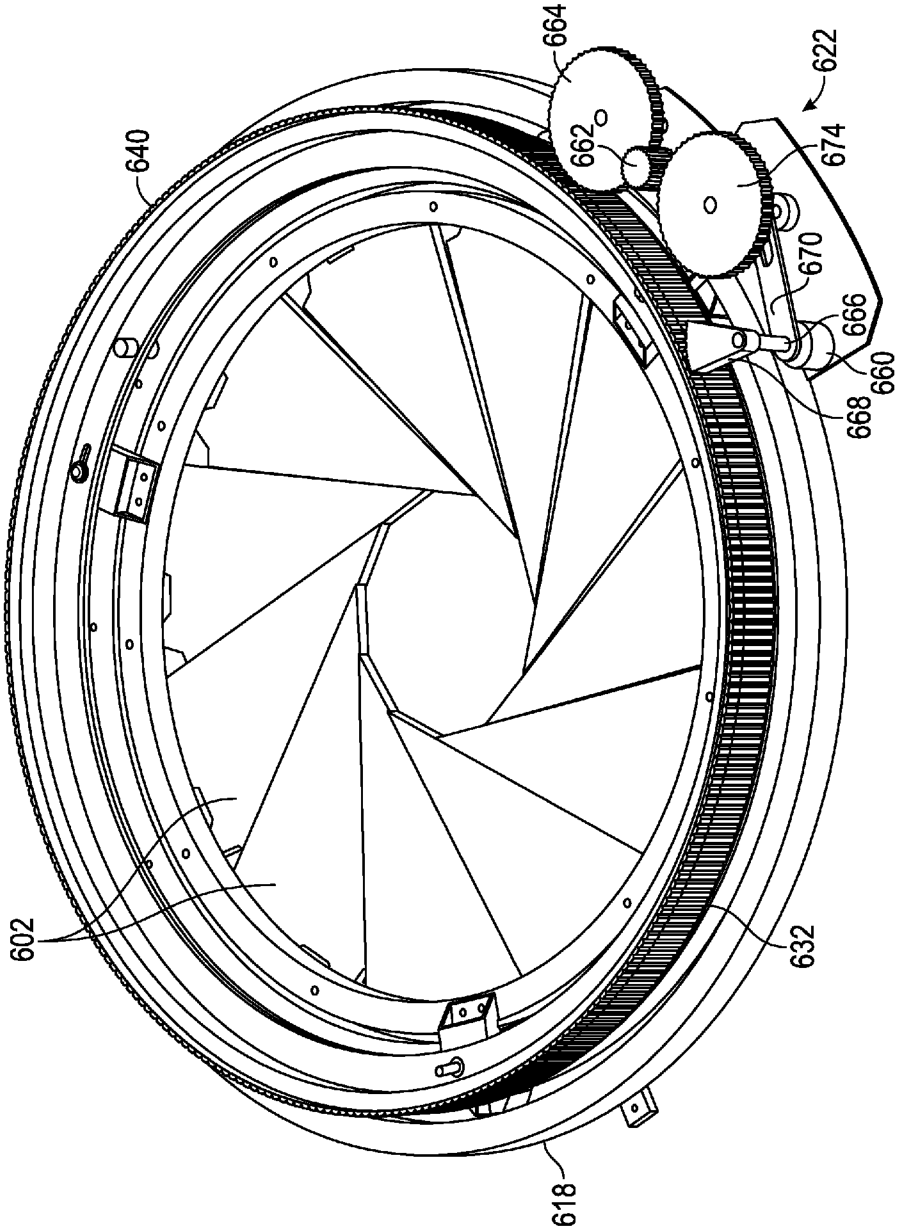

Track structure 712 includes a flat circular base 716 from which a hollow shaft 718 centrally protrudes in the distal direction. An inwardly toothed ring gear 720 protrudes distally from an outer periphery of the circular base 716. The hollow shaft 718 is for connection to a bearing attached to the EGM or top box and bears the weight of the rotating parts of the expand wheel 700. A rotation motor 722 rigidly attached to the EGM has a drive gear 724 that meshes with the ring gear 720 (FIG. 30). Operation of the motor 722 causes the center rotation of the expand wheel 700. Extending proximally from the circular base 716 are four support posts 726 that connect a spoke wheel 728 to the circular base 716. The spoke wheel 728 has a relatively thin cross section, is circular in shape and has plurality of triangularly shaped cutouts 730 spaced around an outer periphery of the spoke wheel 728. Both the circular base 716 and the spoke wheel 728 are centered upon and oriented perpendicular to the central axis of the expand wheel 700.

The triangularly shaped cutouts 730 of the spoke wheel 728 define a plurality of gap piece runways 732 which are alternately interspersed with a plurality of segment runways 734. Formed within each of the gap piece runways 732 is a gap piece track 736. Formed within each of the segment runways 734 is a segment track 738. The tracks 736 and 738 are formed in an outer portion of the spoke wheel 728. Extending both inwardly and distally a short distance from an outer portion of each gap piece runway 732 is a gap piece lift ramp 740. An expand motor 742 (FIG. 34) is centrally positioned on the proximal side of the circular base 716. A keyed shaft 744 extends proximally from the expand motor 742 along the center axis of the expand wheel 700. Extendable from within the keyed shaft 744 is star lift post 746. A center hole 748 is formed within the spoke wheel 728 in X-axis alignment with the star lift post 746.

Figure 34:
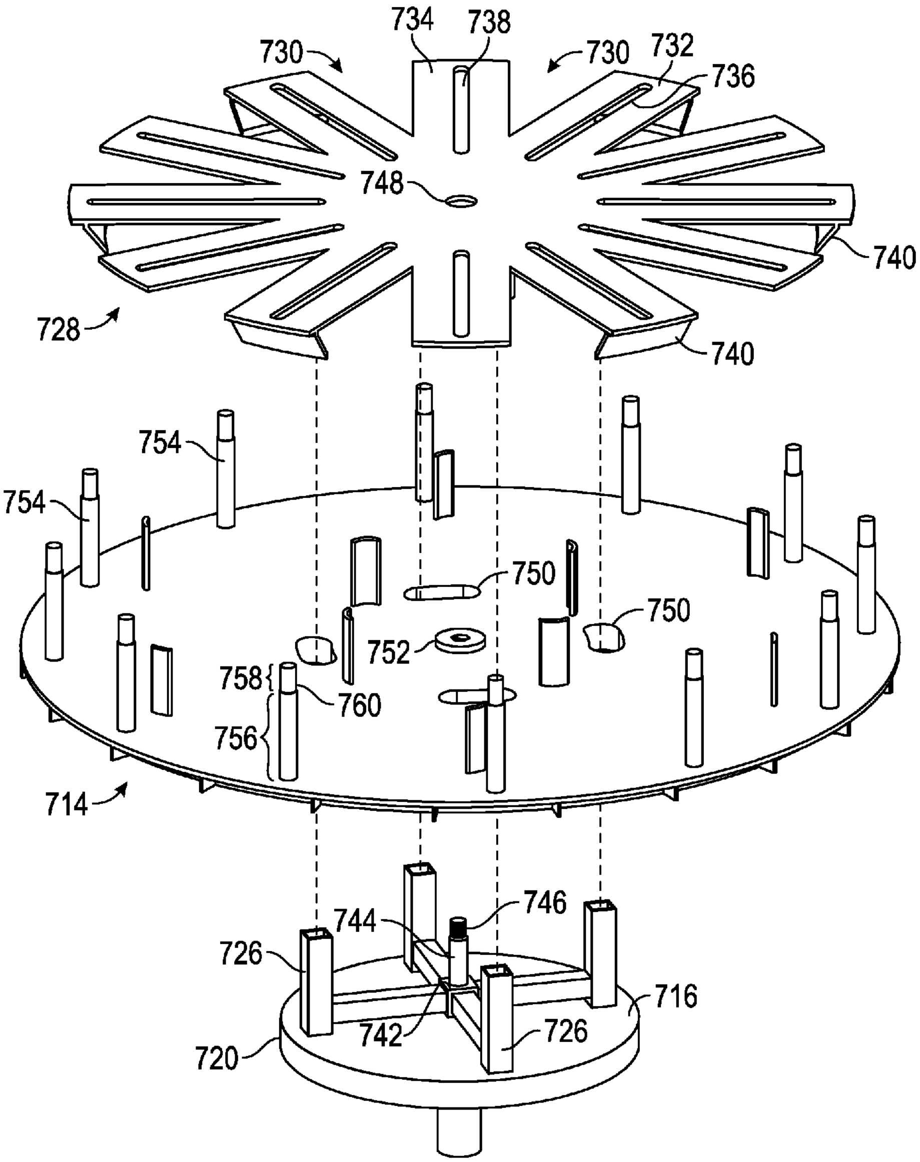

The link activation structure 714 has a circular shape with a relatively thin cross-section and is also orientated perpendicular to and centered upon the central axis of the expand wheel 700. The link activation structure 714 is positioned in between the circular base 716 and the spoke wheel 728, as shown in FIG. 34. Four arc shaped cutouts 750 formed in the link activation structure 714 align with the four support posts 726 that connect the circular base 716 to the spoke wheel 728. The four support posts 726 each pass through a separate one of the arc shaped cutouts 750. A keyed center hole 752 is formed in the center of the link activation structure 714 and matches a cross-sectional shape of the keyed shaft 744. The keyed shaft 744 fits snugly within the keyed center hole 752. Operation of the expand motor 742 causes the keyed shaft 744 and the spoke wheel 728 to rotate relative to the track assembly 712. The degree of relative rotation between the link activation structure 714 and the track structure 712 is limited by the relatively short lengths of the arc shaped cutouts 750.

Figure 36:
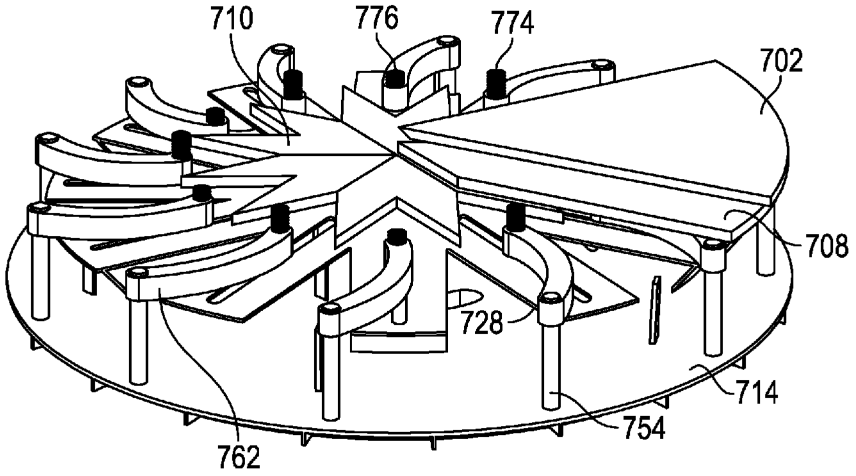
Figure 37:
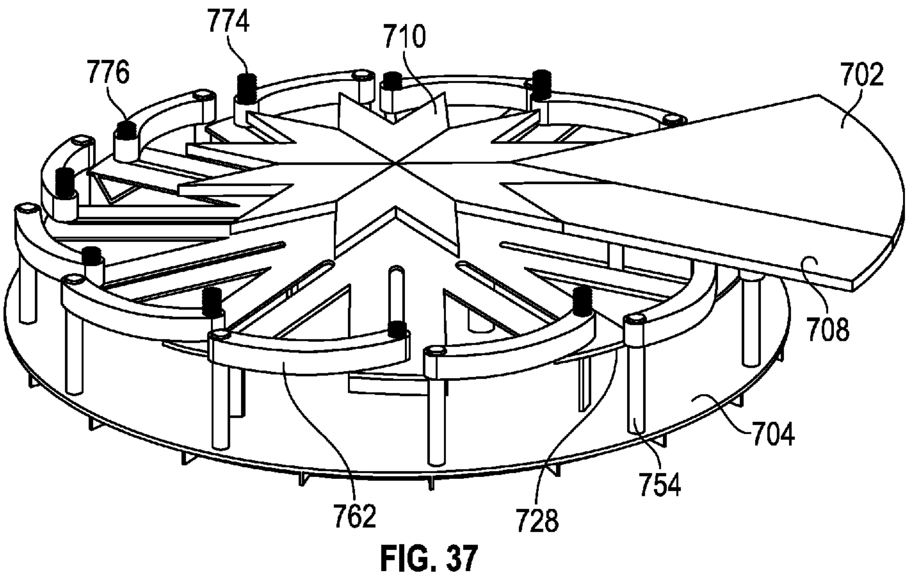
Figure 38:
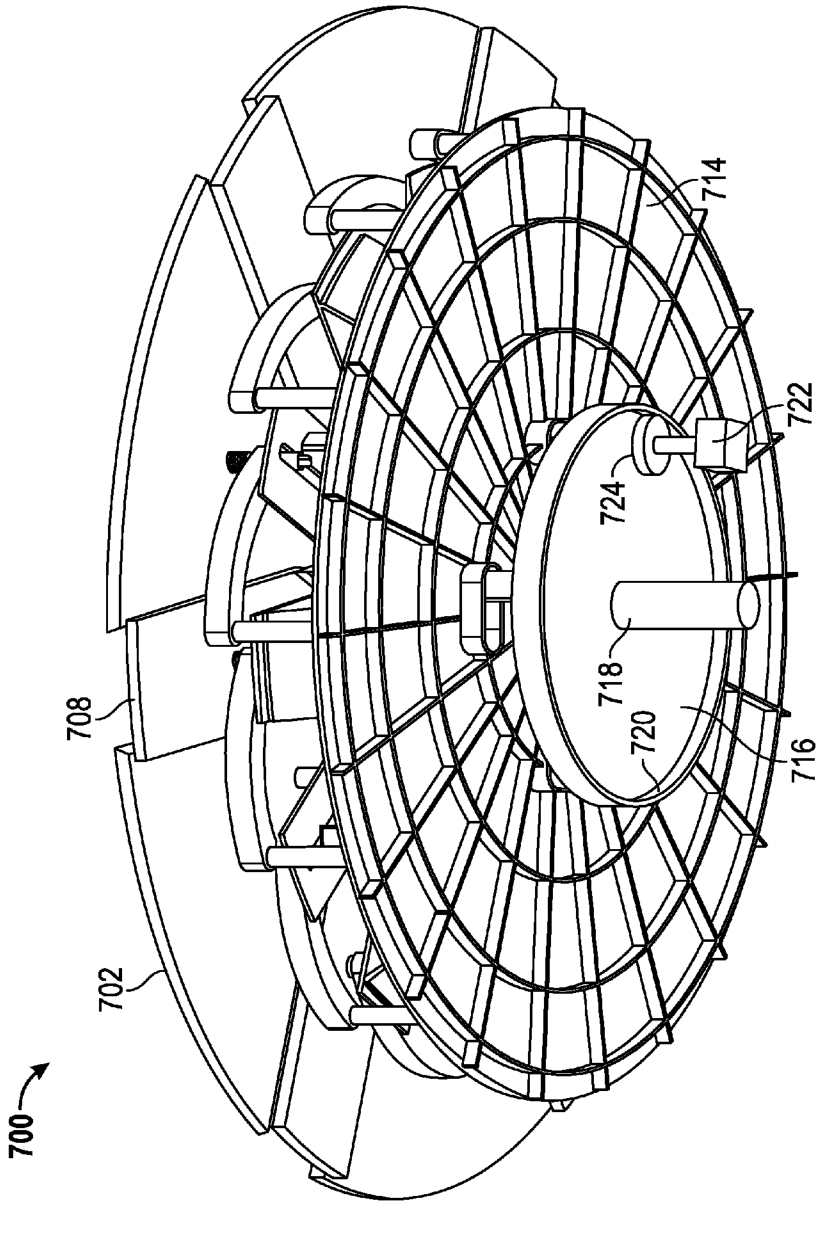
Figure 39:
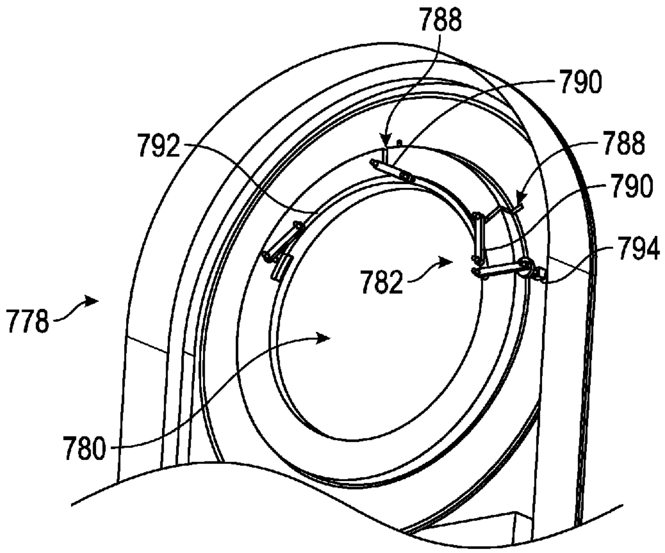

A plurality of link posts 754 extend proximally from an outer periphery of the link structure 714. The link posts 754 each have a base portion 756 and a reduced radius portion 758 at the proximal-most portion of the link posts 754. A ledge 760 defines the boundary between the base portion 756 and the radius portion 758. One of a plurality of C-shaped links 762 is rotationally attached to each of the link posts as shown in FIGS. 36 and 37. Each link 762 has a link post hole 764 (FIG. 35D) formed in one end of the link 762 that fits over the reduced radius portion 758 of one of the link posts 754 such that the link 762 abuts against the ledge 760. The reduced radius portion 756 of each link post 754 is slightly more proximal than a proximal most surface of the spoke wheel 728. This allows clearance for each link 762 to move over the corresponding runway 732 or 734 as the link 762 rotates about the link post 754 to which the link 762 is rotationally attached, as can be understood from FIGS. 36 and 37.

Figure 35A:
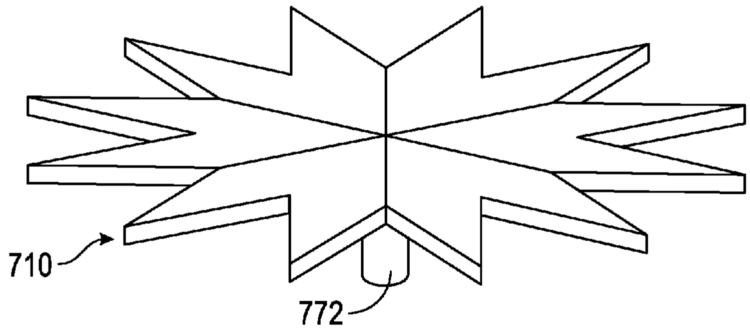
Figure 35B:
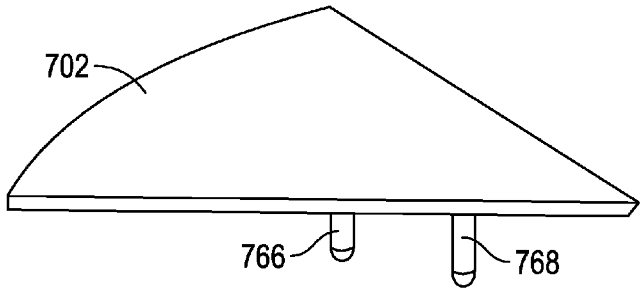
Figure 35C:
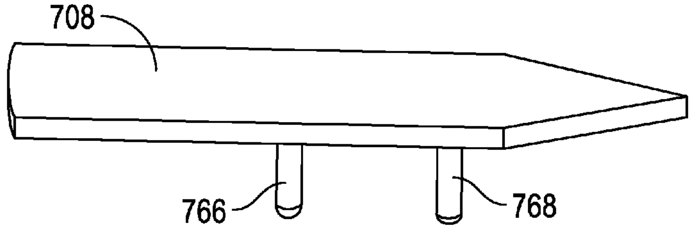
Figure 35D:
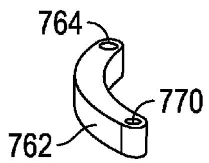

Each of the links 762 (FIG. 35D) is further connected to either one of the segments 702 (FIG. 35B) or one of the gap pieces 708 (FIG. 35C). Each of the segments 702 and the gap pieces 708 has an outer guide pin 766 and an inner guide pin 768 extending in the distal direction. A guide pin hole 770 (FIG. 35D) is formed in the other end of each of the links 762. Each of the outer guide pins 766 is positioned within both a corresponding one of the guide pin holes 770 of one of the links 762 and also a corresponding one of the tracks 736 or 738. Each of the inner guide pins 768 is also positioned within the same one of the tracks 736 or 738 as the corresponding outer guide pin 766. Relative rotation of the spoke wheel 728 with respect to the link activation structure 714 caused by the expand motor causes the links 762 to move the attached outer guide pins 766 along the respective tracks 736 or 738 from an inner most, or contracted orientation shown in FIG. 36 to an outer most, or expanded orientation shown in FIG. 37 (only one of the segments 702 and only one of the gap pieces 708 being shown for clarity). Each segment 702 and each gap piece 708 moves linearly in the radial direction as the relative rotation occurs due to the corresponding pins 764 and 766 of each segment 702 or gap piece 708 being positioned within the same one of the plurality of tracks 736 or 738.

The guide pin holes 770 of each of the links 762 has a depth in the X-axis and has a diameter comparable to the outer guide pins 766 such that the proximal facing surface of each of the segments 702 and the gap pieces 708 maintains a desired orientation in a plane perpendicular to the central axis. The distal ends of the outer guide pins 766 and/or the inner guide pins 768 may have retainers attached thereto (not specifically shown) on the distal side of the runways 732 and 734 to prevent the segments 702 and the gap pieces 708 from detaching from the spoke wheel 728.

The star piece 710 has a keyed shaft 772 (FIG. 35A) that extends distally from a center of the star piece 710 and has a similar non-circular cross-section (not specifically shown) to that of the center hole 748 of the spoke wheel 728, through which the keyed shaft 772 is positioned. The keyed shaft 772 is further attached to the star lift post 746. Operation of the expand motor 742 causes the star piece 710 to either move distally and be positioned proximate to the spoke wheel 728 (corresponding to the contracted orientation shown in FIG. 36) or to move proximally and be displaced from the spoke wheel 728 (corresponding to the expanded orientation shown in FIG. 37). Since the keyed shaft 772 is keyed with the center hole 748 of the spoke wheel 728, the star piece 710 does not rotate relative to the spoke wheel 728.

A relatively large spacer spring 774 is positioned on the outer guide pin 768 of each segment 702 between the segment 702 and the corresponding link 762. The large spacer springs 774 ensure that the segments 702 maintain the same distance from the spoke wheel 728 at all times, whether or not the expand wheel is in the contracted orientation or the expanded orientation. A relatively small spacer spring 776 is positioned on the outer guide pin 768 of each of the gap pieces 708 between the gap piece 708 and the corresponding link 762. The relatively small spacer spring 776 ensures that the gap pieces 708 are offset distally from the segments 702 when the expand wheel 700 is in the contracted state. As can be understood by inspection of FIG. 36, when the expand wheel 700 is in the contracted state, the gap pieces 708 are positioned behind or distally of the segments 702 and therefore are not visible to the player.

The gap pieces 708 maintain this distal offset as the gap pieces 708 move from their inner most orientation towards their outer most orientation until a distal end of the outer guide pin 766 of each gap piece 708 comes into contact with the corresponding gap piece lift ramp 740. The distal end of the outer guide pin 766 of the gap pieces 708 comes into contact with the angled proximal facing surface of the corresponding lift ramps 740 so that continued outer movement of the gap pieces 708 after initial contact with the corresponding gap piece lift ramp 740 causes the gap pieces 708 to rise up or move proximally until the gap pieces are flush with the segments 702, as shown in FIG. 37. At the point in time where the gap pieces 708 start to move proximally due to contact with the gap piece lift ramps 740, adjacent segments 702 have moved far enough apart to create the necessary clearance to allow the gap pieces 708 to fit between the adjacent segments 702.

As can be appreciated by inspection of FIG. 36, while in the contracted orientation, the star piece 710 is positioned distally of the gap pieces 708 which in turn are positioned distally of the segments 702. The expand motor 742 has two functions, that of rotating the keyed shaft 744 and also that of moving the star lift post 746 and the attached star piece 710 in the proximal direction. The star lift post 746 is configured to move in the proximal direction towards the very end of the range of motion of the keyed shaft 744 when rotating towards the expanded orientation to ensure that the segments 702 and the gap pieces 708 have moved outwardly enough to avoid interference by the star piece 710 as the star piece 710 moves in the proximal direction.

Figure 40:
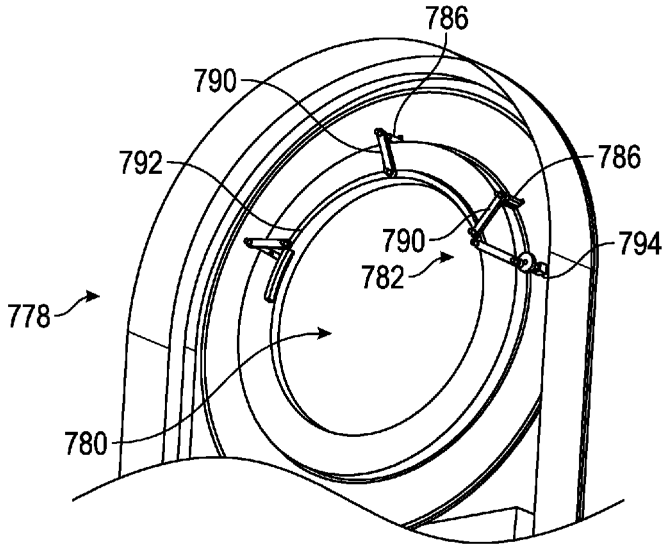

A top box 778 has a circular open area 780 for housing the expand wheel 700. The top box 778 contains an indicator movement mechanism 782 that moves each of three indicators 784 from an inner most position (FIGS. 31A and 39) to an outer most position (FIGS. 31B and 40). Each indicator 784 has a distally facing indicator post 786 that is constrained within an indicator post track 788 formed within the top box 778. Each indicator post 786 is rotationally connected to an indicator link 790 which is further rotationally connected to an arc link 792. The arc link 792 is positioned within an arc link track formed in the housing is rotatable about the center axis of the expand wheel 700. An indicator motor 794 is coupled to the arc link 792 and causes the arc link 792 to move to and from an inner most orientation of the indicators 784 (FIG. 39) to an outer most orientation of the indicators 784 (FIG. 40). The coupled connection of the indicators 784 to the arc link 792 causes the indicators 784 to move between their inner most orientations (FIG. 31A) and their outer most orientations (FIG. 31B) in conjunction with the corresponding movement of the arc link 792.

As can be appreciated by comparison of the distances of the segments 702 and gap pieces 708 from the center between the contracted orientation shown in FIG. 36 and the expanded orientation shown in FIG. 37, the overall diameter of the expand wheel 700 is larger when the expand wheel 700 is in the expanded orientation compared to when the expand wheel 700 is in the contracted orientation. The indicator motor 794 is operated in conjunction with the operation of the expand motor 742 so that the indicators 784 maintain a similar distance from the outer periphery of the expand wheel 700 regardless of whether the expand wheel 700 is in the contracted or expanded orientation.

A wheel game utilizing the expand wheel 700 may be implemented in a variety of ways. Indicia 706 on the subsegments 704 may be within a first tier of an award range, while indicia 706 printed on the gap pieces 708 may fall within a second, and more lucrative, tier of an award range. Thus, play of the wheel game may involve center rotation while the expand wheel 700 is in the contracted state most of the time. Play of the wheel game may involve the expand wheel 700 expanding to the expanded state, creating or appearing to create the possibility of winning one of the higher tier awards printed on the gap pieces 708. Furthermore, the expand wheel 700 may be expanded prior to, during, or after the center rotation of the expand wheel 700. The play of the wheel game may be triggered by two different distinct events each causing play of the wheel game in either the contracted orientation or the expanded orientation. For example, a contracted orientation scatter symbol appearing during play of the base game may initiate play of the wheel game in the contracted orientation and an expanded orientation scatter symbol appearing during play of the base game may initiate play of the wheel game in the expanded orientation.

Some wheel games utilizing the expand wheel 700 may involve the use of only one of the indicators 784. The indicators 784 may have lighting built-in to indicate whether or not each indicator 784 is active, then only awards corresponding to the active indicators 784 are awarded. A version of the wheel game may involve the lights of the indicators 784 being lit in sequence after the center rotation, and then randomly choosing one indicator 784 to remain lit and become the active indicator 784. Other variations of the wheel game may involve each indicator 784 corresponding to a different one of multiple players who jointly participate in play of the wheel game.

The star piece 710 of the expand wheel 700 may be used as merely a filler component to occupy the space that the segments 702 and the gap pieces 708 create when the move to the expanded orientation. In this case, the star piece 710 does not contribute to the award outcome. Other embodiments of the expand wheel 700 may involve the star piece 710 being partitioned into its own subsegments, each potentially having some effect on the award outcome, such as by displaying a multiplier that is in radial alignment with winning indicia of a segment subsegment or gap piece. A variation of this type of enhancement might involve the star piece having the capability to rotate with respect to the segments 702 and gap pieces 708 such that multipliers or other game enhancing properties of the star piece may be associated with different ones of the indicia printed on the susegments 704 or the indicia printed on the gap pieces 708. Of course, such rotation would have to occur before the star piece 710 is moved into its proximal most position in the expanded orientation to avoid interference with the segments 702 and gap pieces 708.

A variety of different wheel embodiments and wheel games associated with each wheel embodiment have been described above. Many of the wheel game ideas discussed in conjunction with a specific wheel embodiment are applicable to the other wheel embodiments. Variations in the numbers of indicators of each wheel embodiment are also contemplated. Variations in whether the segments of any wheel embodiment rotate around the center axis while the indicators remain stationary or whether the indicators rotate around the center axis while the segments remain stationary are contemplated.

Presently preferred embodiments of the invention and many of its improvements have been described herein with a degree of particularity. This description is of preferred examples of implementations of the invention, and is not necessarily intended to limit the scope of the invention. The scope of the invention is defined by the following claims.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing agent. Alternatively or in addition, the program instructions can be encoded on an artificially-generated propagated signal, e.g., a machine-generated electrical, optical, or electromagnetic signal, that is generated to encode information for transmission to suitable receiver agent for execution by a data processing agent. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing agent on data stored on one or more computer-readable storage devices or received from other sources.

The term "client or "server" include all kinds of agent, devices, and machines for processing data, including by way of example a programmable processor, a computer, a system on a chip, or multiple ones, or combinations, of the foregoing. The agent can include special purpose logic circuitry, e.g., an FPGA (field programmable gate array) or an ASIC (application-specific integrated circuit). The agent can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The agent and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and agent can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

It should further be noted that for purposes of this disclosure, the term "couple" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or, alternatively, may be removable or releasable in nature.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. An electronic gaming machine comprising:

a cabinet;

a first display coupled to the cabinet;

a wheel assembly coupled to the cabinet, the wheel assembly comprising:

an annular ring guide stationarily coupled to the cabinet, a first annular ring coupled to the annular ring guide, the first annular ring positioned concentrically with respect to and rotatable with respect to the annular ring guide about a center axis of the wheel assembly, a second annular ring coupled to the annular ring guide, the second annular ring positioned concentrically with respect to and rotatable with respect to the annular ring guide about the center axis of the wheel assembly, a plurality of wheel segments, each wheel segment generally wedge shaped having two relatively long straight sides separated by an acute angle having a common end at an inner apex, each wheel segment having first and second attachment points at an outer portion of each wheel segment, the first attachment point of each wheel segment coupled to the first annular ring, the second attachment point of each wheel segment coupled to the second annular ring, and an activation mechanism; and a processor communicatively coupled to the first display, and the activation mechanism, wherein the processor is configured to provide game play of a wager based game to a player, display gaming information to the player through the first display, detect a trigger event during game play of the wager-based game, and instruct the activation mechanism to move the plurality of wheel segments;

wherein the activation mechanism is configured to move the plurality of wheel segments relative to each other between a closed orientation, in which the first annular ring and the second annular ring have a first angular relationship such that the inner apexes of the plurality of wheel segments are colocated about the center axis, and an open orientation, in which the first annular ring and the second annular ring have a second angular relationship, different than the first angular relationship, such that the inner apexes of the plurality of wheel segments are spaced apart from each other along a circle about the central axis; and wherein the activation mechanism is configured to rotate the plurality of wheel segments about a central axis.

2. The electronic gaming machine of claim 1, further comprising:

a first ring gear attached to the first annular ring, a second ring gear attached to the second annular ring, a first gear configured to mesh with the first ring gear, a second gear configured to mesh with the second ring gear, and a first motor coupled to the first gear and the second gear such that the first gear and the second gear spin in the same direction when the drive motor is activated;

wherein when the first motor is activated, the first annular ring and the second annular ring rotate at the same speed to effectuate rotation of the plurality of wheel segments about the central axis.

3. The electronic gaming machine of claim 2, wherein the second gear is configured to be selectively disengaged from the second ring gear in order to allow relative motion between the first annular ring and the second annular ring.

4. The electronic gaming machine of claim 3, wherein the activation assembly further includes a second motor configured to cause relative motion between the first annular ring and the second annular ring.

5. The electronic gaming machine of claim 1, wherein the activation mechanism includes a first motor configured to effectuate rotation of the plurality of wheel segments about the central axis and a second motor configured to effectuate movement of the plurality of wheel segments between the closed orientation and the open orientation.

6. The electronic gaming machine of claim 1, wherein each of the plurality of wheel segments has at least one symbol formed thereon, and the wheel assembly further comprises an indicator to indicate a selected one of the symbols.

7. The electronic gaming machine of claim 6, wherein the processor is programmed to initiate play of a bonus round in response to the trigger event and to cause the activation mechanism to rotate the plurality of wheel segments about the central axis in the closed orientation and to subsequently stop the rotation when a specified symbol of the plurality of symbols is in alignment with the indicator, the processor being further programmed to cause an award amount associated with the specified symbol to be awarded to the player.

8. The electronic gaming machine of claim 7, further comprising a second display, the second display concealed by the plurality of wheel segments when the wheel segments are in the closed orientation, the second display visible from the perspective of a player of the electronic gaming machine when the wheel segments are in the open orientation, and wherein:

when the specified symbol is a special symbol, the activation mechanism causes the wheel segments to move from the closed orientation to the open orientation to reveal the second display, and the processor causes the second display to display an award amount associated with the special symbol.

9. The electronic gaming machine of claim 1, wherein each of the plurality of wheel segments has a generally thin planar cross-section, the plurality of wheel segments are not coplanar with each other in either the open orientation or the closed orientation of the wheel segments, and a portion of each wheel segment overlaps a portion of each adjacent wheel segment when the wheel segments are in the open orientation.

10. The electronic gaming machine of claim 1, further comprising a second display, the second display concealed by the plurality of wheel segments when the wheel segments are in the closed orientation, the second display visible from the perspective of a player of the electronic gaming machine when the wheel segments are in the open orientation.

11. The electronic gaming machine of claim 1, wherein the first annular ring has a smaller diameter than a diameter of the second annular ring, the first annular ring is positioned concentrically inside the second annular ring, the annular guide is formed to define an inner facing ring-like trough, the electronic gaming machine further comprising:

a plurality of spacer mechanisms attached to the first annular ring and extending outward from the first annular ring, the plurality of spacer mechanisms defining a ring space within which the second annular ring is confined, each of the plurality of spacer mechanisms terminating with a roller which fits within the ring-like trough of the annular guide.

12. The electronic gaming machine of claim 11, wherein each ring space of the plurality of spacer mechanisms is sized to confine the lateral movement of the second annular ring while allowing rotation of the second annular ring with respect to the first annular ring as the wheel segments are moved between the closed and open orientations.

13. The electronic gaming machine of claim 12, wherein the plurality of spacer mechanisms and the second annular ring have formed or defined thereon a pin and slot configuration which limits the relative angular rotation between the first annular ring and the second annular ring.

14. The electronic gaming machine of claim 11, further comprising:

a plurality of spacing elements, each of which couples the first attachment point of one of the plurality of wheel segments to the first annular ring, each spacing element locating a side of one of the plurality of wheel segments closest to the first attachment point further from the first annular ring than the opposite side of the wheel segment, each wheel segment being rotatable about the first attachment point to a degree dependent upon the relative positions of the first annular ring and the second annular ring; and a plurality of links, each of which couples the second attachment point of one of the plurality of wheel segments to the second annular ring.

15. The electronic gaming machine of claim 1, further comprising:

an annular cover attached to the wheel assembly which remains fixed in position relative to the electronic gaming machine, and which obscures from view of the player the outer portion of each of the plurality of wheel segments.

16. A wheel assembly for a gaming machine, the wheel assembly comprising:

a plurality of wheel segments, each of the plurality of wheel segments being generally wedge shaped and having a front surface upon which is formed one or more symbols;

a display positioned behind the plurality of wheel segments from a perspective of a viewer viewing the front surfaces of the plurality of wheel segments, and an activation mechanism;

wherein the activation mechanism is configured to move the plurality of wheel segments relative to each other between a closed orientation, in which the plurality of wheel segments obscure the display from the perspective of the viewer, and an open orientation, in which the plurality of wheel segments form an opening that allows the display to be viewable through the opening from the perspective of the viewer, the symbols formed on the plurality of wheel segments being viewable from the perspective of the viewer in both the closed and open orientations; and wherein the activation mechanism is configured to rotate the plurality of wheel segments about a central axis.

17. The wheel assembly of claim 16, further comprising an annular ring guide coupled to the cabinet, wherein the activation mechanism is coupled to the annular ring guide, and wherein the ring guide remains stationary with respect to the cabinet during the rotation and movement of the plurality of wheel segments.

18. The wheel assembly of claim 17, further comprising an inner ring assembly having a plurality of spacer mechanisms and an inner ring gear, wherein the inner ring assembly is positioned concentrically within the annular ring guide.

19. The wheel assembly of claim 18, wherein each of the plurality of spacer mechanisms includes a roller, and wherein each roller is received in a trough formed in the annular ring guide.

20. The wheel assembly of claim 18, further comprising an outer ring assembly having an outer ring gear, wherein the outer ring assembly is positioned concentrically between the annular ring guide and the inner ring assembly.

21. The wheel assembly of claim 20, wherein each of the plurality of wheel segments is coupled to both the inner ring assembly and the outer ring assembly.

22. The wheel assembly of claim 21, wherein each of the plurality of wheel segments is coupled to the inner ring assembly with a pin and the outer ring assembly with a lever arm such that relative motion between the inner ring assembly and the outer ring assembly causes the plurality of wheel segments to move between the open orientation and the closed orientation.

23. The wheel assembly of claim 21, further comprising:

a first gear configured to mesh with the inner ring gear, a second gear configured to mesh with the outer ring gear, and a first motor coupled to the first gear and the second gear such that the first gear and the second gear spin in the same direction when the drive motor is activated;

wherein when the first motor is activated, the inner ring assembly and the outer ring assembly rotate at the same speed to effectuate rotation of the plurality of wheel segments about the central axis.

24. The wheel assembly of claim 23, wherein the second gear is configured to be selectively disengaged from the outer ring gear in order to allow relative motion between the inner ring assembly and the outer ring assembly.

25. The wheel assembly of claim 23, wherein the activation mechanism further includes a second motor configured to cause relative motion between the inner ring assembly and the outer ring assembly.

26. The wheel assembly of claim 16, wherein the activation mechanism includes a first motor configured to effectuate rotation of the plurality of wheel segments about the central axis and a second motor configured to effectuate movement of the plurality of wheel segments between the closed orientation and the open orientation.

27. The wheel assembly of claim 16, wherein each of the plurality of wheel segments includes a dividing line separating the front surface of each of the plurality of wheel segments into two subsegments, and each subsegment has a different one of the symbols formed thereon.

28. The wheel assembly of claim 16, wherein the wheel assembly further comprises an indicator to indicate an individual wheel segment.

29. The wheel assembly of claim 28, wherein the indicator is configured to indicate a sub-segment of the individual wheel segment.

* * * * *